United States Patent
Elsaid Ibrahim et al.

(10) Patent No.: US 9,881,187 B2
(45) Date of Patent: Jan. 30, 2018

(54) RFID READER AND METHOD FOR ADJUSTING A FRAME LENGTH OF AN RFID SYSTEM COMPRISING AN RFID READER

(71) Applicants: Fraunhofer-Gesellschaft zur Foerderung der angewandten Forschung e.V., Munich (DE); Friedrich-Alexander-Universitaet Erlangen-Nuernberg, Erlangen (DE)

(72) Inventors: Hazem Elsaid Ibrahim, Erlangen (DE); Hamed Kenawy, Erlangen (DE); Joerg Robert, Uttenreuth (DE); Albert Heuberger, Erlangen (DE); Wolfram Strauss, Nuremberg (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 76 days.

(21) Appl. No.: 15/148,483

(22) Filed: May 6, 2016

(65) Prior Publication Data
US 2016/0328583 A1    Nov. 10, 2016

(30) Foreign Application Priority Data
May 7, 2015 (EP) .................................... 15166802

(51) Int. Cl.
*G06K 7/10* (2006.01)
(52) U.S. Cl.
CPC ..... *G06K 7/10069* (2013.01); *G06K 7/10019* (2013.01); *G06K 7/10029* (2013.01); *G06K 7/10039* (2013.01); *G06K 7/10089* (2013.01)
(58) Field of Classification Search
CPC ........... G06K 7/10069; G06K 7/10029; G06K 7/10019; G06K 7/10039; G06K 7/10089
See application file for complete search history.

(56) References Cited

U.S. PATENT DOCUMENTS 8,477,016 B2 * 7/2013 Seo ...................... G06K 7/0008
340/10.2
8,798,540 B2 * 8/2014 Choi ................... G06K 7/0008
340/572.1
(Continued)

OTHER PUBLICATIONS

"EPC Radio-frequency Protocols Class-1 Generation-2 UHF RFID Protocol for Communications at 860 MHz 960 MHz version 1.1.0", Specification for RFID Air Interface, EPC Global, Dec. 7, 2005, 100 pages.
(Continued)

*Primary Examiner* — Thomas Alunkal
(74) *Attorney, Agent, or Firm* — Perkins Coie LLP; Michael A. Glenn

(57) ABSTRACT

Embodiments provide an RFID reader. The RFID reader includes a collision detector, a decoder and a frame length adjuster. The collision detector is configured to detect for each slot of a plurality of slots of a current frame, in which a collision of signals transmitted by at least two RFID tags occurred, a signal property of a signal of the signals transmitted by at least two RFID tags. The decoder is configured to decode for the slot in which the collision is detected the signal of the signals transmitted by the at least two RFID tags using the detected signal property, wherein a collision recover probability describing a probability that the decoder can accurately decode the one signal depends on a signal-to-noise ratio (SNR) of the current frame. The frame length adjuster is configured to adjust a frame length of a subsequent frame in dependence on the collision recover probability.

14 Claims, 17 Drawing Sheets

(56) References Cited

U.S. PATENT DOCUMENTS

| | | | | |
|---|---|---|---|---|
| 2004/0046642 | A1* | 3/2004 | Becker | G01V 15/00 340/10.32 |
| 2008/0150692 | A1* | 6/2008 | Missimer | G06K 7/0008 340/10.1 |
| 2010/0026462 | A1* | 2/2010 | Lim | H04Q 9/00 340/10.1 |
| 2010/0109847 | A1* | 5/2010 | Noel | G06K 7/0008 340/10.2 |
| 2010/0265070 | A1* | 10/2010 | Shin | G06K 7/0008 340/572.4 |
| 2011/0063085 | A1* | 3/2011 | Jang | H04W 28/06 340/10.2 |
| 2013/0222118 | A1* | 8/2013 | Felemban | G06K 7/01 340/10.2 |
| 2016/0239692 | A1* | 8/2016 | Lee | G06K 7/10029 |

OTHER PUBLICATIONS

Angerer, C. et al., "Advanced Synchronisation and Decoding in RFID Reader Receivers", IEEE Radio and Wireless Symposium, RWS '09, Jan. 2009, pp. 59-62.

Angerer, C. et al., "RFID Reader Receivers for Physical Layer Collision Recover", Communications, IEEE Transactions on vol. 58, Dec. 2010, pp. 3526-3537.

Griffin, J. et al., "Gains for RF Tags Using Multiple Antennas", IEEE Transactions on Antennas and Propagation, vol. 56, Feb. 2008, pp. 563-570.

Khasgiwale, R.U.A.R.S. et al., "Extracting Information from Tag Collisions", IEEE International Conference RFID, 2009.

Liu, Y. et al., "Digital Correlation Demodulator Design for RFID Reader Receiver", IEEE Wireless Communications and Networking Conference, WCNC 2007, Mar. 2007, pp. 1664-1668.

Shen, D.P.R.A.B.L.D. et al., "Separation of Multiple Passive RFID Signals Using Software Defined Radio", IEEE International Conference RFID, 2009.

Simon, M. et al., "Some Interesting Observations for Certain Line Codes with Application to RFID", IEEE Transactions on Communications, vol. 54, Apr. 2006, pp. 583-586.

Vogt, H., "Efficient Object Identification with Passive RFID Rags", International Conference on Pervasive Computing, Zurich, Aug. 2002.

Wang, Yung-Yi et al., "A Baseband Signal Processing Scheme for Joint Data Frame Synchronization and Symbol Decoding for RFID Systems", Hindawi Publishing Corporation, Eurasip Journal on Advances in Signal Processing, vol. 2010, Article ID 724260, Apr. 2010, pp. 1-11.

Wei, P. et al., "Synchronization With Timing Recovery Loop in UHF RFID Reader Receivers", In 17th IEEE International Conference on Electronics, Circuits, and Systems (ICECS), Dec. 2010, pp. 1148-1151.

* cited by examiner

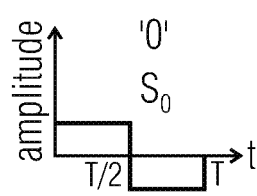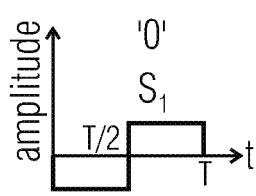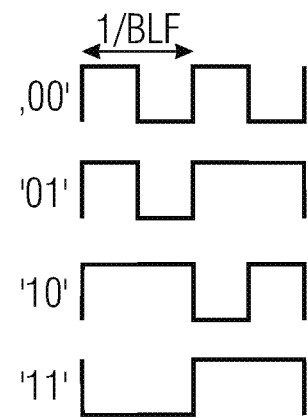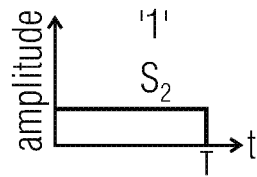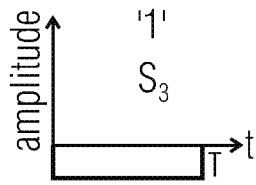
Fig. 3a
Fig. 3b
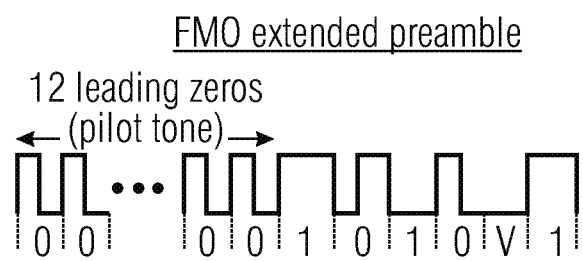
Fig. 3c

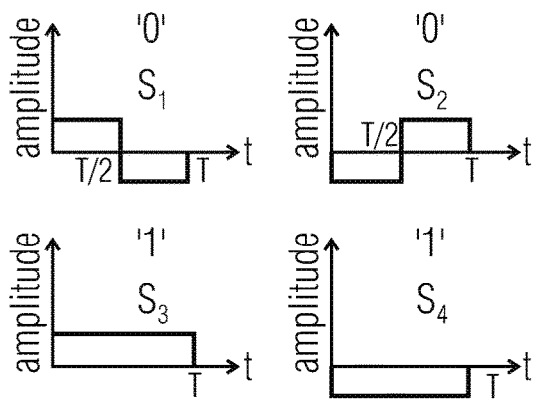
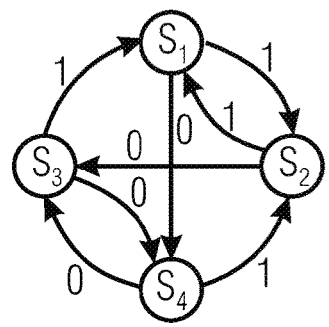
Fig. 3d          Fig. 3e
Miller extended preamble
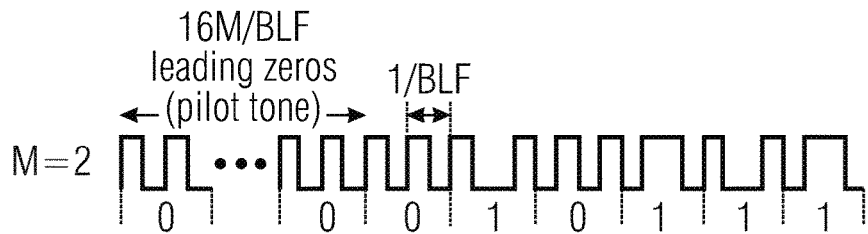
Fig. 3f

RFID READER AND METHOD FOR ADJUSTING A FRAME LENGTH OF AN RFID SYSTEM COMPRISING AN RFID READER

CROSS-REFERENCE TO RELATED APPLICATIONS

This application claims priority from European Patent Application No. 15166802.7, which was filed on May 7, 2015, and is incorporated herein in its entirety by reference.

BACKGROUND OF THE INVENTION

Embodiments relate to an RFID reader. Further embodiments relate to a method for adjusting a frame length of an RFID system comprising an RFID reader and at least two RFID tags. Some embodiments relate to a new frame length optimization using collision recovery probability for frame slotted ALOHA (ALOHA is a channel access method for wireless transmission that allows uncoordinated users to share a common transmission resource).

In the recent years, the number of applications that use Radio Frequency Identification (RFID) Systems has increased, and the identification rate became one of the most critical issues in these applications. Such RFID networks consist of: 1) Readers (Interrogators), which are responsible of scanning the interrogation area and identifying the tags. 2) Tags (Transponders), which store the data to be read by the readers. In RFID systems, the tags typically share a common communications channel. Thus, there is a certain probability of tag-collisions, i.e. multiple tags answers simultaneously. This collision probability naturally increases in dense networks with many tags. As a result, the reader is responsible for coordinating the network and has to avoid tags collisions using specific anti-collision algorithms. This application focuses mainly on Ultra High Frequency tags which follow EPCglobal Class-1 Gen-2 standards [EPC radio-frequency protocols class-1 generation-2 UHF RFID protocol for communications at 860 MHz 960 MHz version 1.1.0 2006].

According to EPCglobal Class-1 Gen-2 standards, the conventional anti-collision algorithm is Frame Slotted ALOHA (FSA) algorithm, which is only Medium Access Control (MAC) layer protocol. In this algorithm, only the single tag reply (successful slot) are able to be decoded and then identified. Therefore, the conventional definition of the expected reading efficiency $\eta_{conv}$ is equivalent to the probability of success P(S) [H. Vogt, "Efficient object identification with passive RFID rags", in International Conference on Pervasive Computing, Zurich, August 2002]:

$$\eta_{conv} = P(S) = P(1)$$

where $$(1) = \frac{n}{L}\left(1 - \frac{1}{L}\right)^{n-1},$$

n represents the number of tags in the reading area, and L is the frame length. The main goal is to find the optimal frame length L, which maximizes the reading efficiency $\eta_{conv}$. Based on the above equation, the reading efficiency $\eta_{conv}$ is maximized to be $\eta_{conv(max)}$=36% when L=n as shown in [H. Vogt, "Efficient object identification with passive RFID rags", in International Conference on Pervasive Computing, Zürich, August 2002].

However, in recent years some research groups concentrated more on the physical layer (PHY): Khasgiwale et al, [R. U. A. R. S. Khasgiwale and D. W. Engels, "Extracting information from tag collisions", IEEE International Conference RFID, 2009] could extract information from the physical layer about the number of collided tags at the collided slot, which helps a lot in the estimation of the exact number of tags in the reading area. Shen et al. [D. P. R. A. B. L. D. Shen, G. Woo and J. Wang, "Separation of multiple passive RFID signals using software defined radio", IEEE International Conference RFID, 2009] proposed a collision recovery algorithm for the collided tags based on the signal constellations, however he focused only on Low Frequency (LF) Tags. Christoph Angerer [C. Angerer, R. Langwieser, and M. Rupp, "RFID reader receivers for physical layer collision recovery", Communications, IEEE Transactions on, vol. 58, pp. 3526_3537, December 2010] focused on the collision recovery of UHF tags. The authors used the characteristics of the RFID signals to separate signals from collisions at the physical layer. However, due to the limitation of the channel estimation, the authors proposed a collision recovery only for two tags. They also have proposed a new reading efficiency metric which includes the tags which are recovered based on the PHY layer work. This reading efficiency can be expressed as:

$$\eta_{PHY} = P(1) + P(2)$$

where $$P(2) = \frac{n}{2}\left(\frac{1}{L}\right)^2\left(1 - \frac{1}{L}\right)^{n-2}.$$

Based on the above equation, the authors assumed that the reader will resolve 1 from the two tags collided slots, and then they proposed a fixed frame length which maximize the efficiency in the above equation which is L=0.707*n.

SUMMARY

According to an embodiment, an RFID reader may have: a collision detector configured to detect for each slot of a plurality of slots of a current frame, in which a collision of signals transmitted by at least two RFID tags occurred, a signal property of a signal of the signals transmitted by the at least two RFID tags; a decoder configured to decode for the slot in which the collision is detected the signal of the signals transmitted by the at least two RFID tags using the detected signal property, wherein a collision recover probability describing a probability that the decoder can accurately decode the one signal depends on a signal-to-noise ratio of the current frame; and a frame length adjuster configured to adjust a frame length of a subsequent frame in dependence on the collision recover probability.

According to another embodiment, a method for adjusting a frame length of an RFID system including an RFID reader and at least two RFID tags may have the steps of: detecting for each slot of a plurality of slots of a current frame, in which a collision of signals transmitted by at least two RFID tags occurred, a signal property of a signal of the signals transmitted by the at least two RFID tags; decoding for the slot in which the collision is detected the signal of the signals transmitted by the at least two RFID tags using the detected signal property, wherein a collision recover probability describing a probability that the one signal can be accurately decoded depends on a signal-to-noise ratio of the current frame; and adjusting a frame length of a subsequent frame in dependence on the collision recover probability.

Another embodiment may have a non-transitory digital storage medium having a computer program stored thereon to perform the method for adjusting a frame length of an RFID system including an RFID reader and at least two RFID tags, the method having: detecting for each slot of a plurality of slots of a current frame, in which a collision of signals transmitted by at least two RFID tags occurred, a signal property of a signal of the signals transmitted by the at least two RFID tags; decoding for the slot in which the collision is detected the signal of the signals transmitted by the at least two RFID tags using the detected signal property, wherein a collision recover probability describing a probability that the one signal can be accurately decoded depends on a signal-to-noise ratio of the current frame; and adjusting a frame length of a subsequent frame in dependence on the collision recover probability, when said computer program is run by a computer.

Embodiments provide an RFID reader. The RFID reader comprises a collision detector, a decoder and a frame length adjuster. The collision detector is configured to detect for each slot of a plurality of slots of a current frame, in which a collision of signals transmitted by at least two RFID tags occurred, a signal property of a signal of the signals transmitted by at least two RFID tags. The decoder is configured to decode for the slot in which the collision is detected the signal of the signals transmitted by the at least two RFID tags using the detected signal property, wherein a collision recover probability describing a probability that the decoder can accurately decode the one signal depends on a signal-to-noise ratio (SNR) of the current frame. The frame length adjuster is configured to adjust a frame length of a subsequent frame in dependence on the collision recover probability.

According to the concept of the present invention, a total number of slots necessitated for reading out a reading area having a given number of different tags can be further reduced by adjusting the frame length of (each) subsequent frame in dependence on the collision recover probability which depends on the signal-to-noise ratio (SNR) of the current frame.

Advantageous implementations are addressed by the dependent claims.

In embodiments, the RFID reader comprises a decoder configured to decode for the slot in which the collision is detected the signal of the signals transmitted by the at least two RFID tags having the greatest signal strength, wherein the frame length adjuster is configured to determine the collision recover probability describing a probability that the decoder can accurately decode the signal having the strongest signal strength in dependence on the signal-to-noise ratio of the current frame.

In embodiments, the frame length adjuster is configured to determine the collision recover probability per frame.

In embodiments, the frame length adjuster is configured to adjust the frame length of the subsequent frame further in dependence on a collision probability describing the probability of the collision of the signals transmitted by the at least two RFID tags, i.e. that at least two RFID tags transmit signals in the same slot.

For example, the frame length adjuster can be configured to determine the collision probability $P_{col.}(i)$ using the formula:

$$P_{col.}(i) = \binom{n}{i}\left(\frac{1}{L}\right)^{i}\left(1-\frac{1}{L}\right)^{n-i}$$

wherein n describes a number of tags in a reading area, wherein i describes a number of tags transmitting signals in the same slot, and wherein L describes the frame length.

In embodiments the frame length adjuster is configured to determine a reading efficiency of the RFID reader in dependence on the collision probability and the determined collision recover probability, and wherein the frame length adjuster is configured to adjust the frame length of the subsequent frame using the reading efficiency of the RFID reader.

In embodiments the frame length adjuster is configured to adjust the frame length of the subsequent frame such that the reading efficiency of the RFID reader is increased or even maximized.

For example, the frame length adjuster can be configured to determine the reading efficiency $\eta_{DCR}$ based on the formula:

$$\eta_{DCR} = P(1) + \sum_{i=2}^{n} \alpha_i P_{col.}(i)$$

wherein P(1) describes the probability that only one RFID tag transmits a signal per slot, $P_{col.}(i)$ describes the probability that at least two RFID tags transmit signals per slot, $\alpha_i$ describes the probability that the decoder can accurately decode the signal having the strongest signal strength when at least two RFID tags transmit signals per slot.

Further embodiments provide a method for adjusting a frame length of an RFID system comprising an RFID reader and at least two RFID tags, the method comprises:
  detecting for each slot of a plurality of slots of a current frame, in which a collision of signals transmitted by at least two RFID tags occurred, a signal property of a signal of the signals transmitted by at least two RFID tags;
  decoding for the slot in which the collision is detected the signal of the signals transmitted by the at least two RFID tags using the detected signal property, wherein a collision recover probability describing a probability that the one signal can be accurately decoded depends on a signal-to-noise ratio of the current frame; and
  adjusting a frame length of a subsequent frame in dependence on the collision recover probability.

Some embodiments provide an RFID reader. The RFID reader comprises a collision detector and a decoder. The collision detector is configured to detect for each slot of a plurality of slots of a current frame, in which a collision of signals transmitted by at least two RFID tags occurred, a signal property of a signal of the signals transmitted by at least two RFID tags. The decoder is configured to decode for the slot in which the collision is detected the signal of the signals transmitted by the at least two RFID tags using the detected signal property.

In embodiments, the collision detector can be configured to detect the signal property of the signal having the greatest signal strength, wherein the decoder can be configured to decode for the slot in which the collision is detected the signal of the signals transmitted by the at least two RFID tags having the greatest signal strength.

In embodiments the collision detector can be configured to determine (or estimate) a rate (e.g., backscatter link frequency) of the signal having the greatest signal strength using FFT (fast Fourier transform) in order to obtain the signal property, wherein the decoder can be configured to use the determined signal property (e.g., rate) for decoding the signal having the greatest signal strength.

For example, the collision detector can be configured to determine (or estimate) the rate of the signal having the greatest signal strength by applying the FFT on a preamble part of the signal.

In embodiments the decoder can be configured to shift a signal received by the RFID reader by half symbol (in dependence on the determined rate of the signal having the greatest signal strength), wherein the signal received comprises the signals transmitted by the at least two RFID tags in the same slot.

In embodiments the decoder can be configured to correlate the received signal with an antipodal basis function in order to obtain a reconstructed signal, wherein the decoder is configured to decode the one signal having the strongest signal strength by using the reconstructed signal.

In embodiments the decoder is configured to decode the one signal having the strongest signal strength by decoding the reconstructed signal using FM0 or Miller basis functions.

BRIEF DESCRIPTION OF THE DRAWINGS

Embodiments of the present invention will be detailed subsequently referring to the appended drawings, in which:

FIG. 3a shows in diagrams four different pulse shapes used for representing data-0 and data-1 according to FM0 encoding;

FIG. 3b shows in diagrams four allowable symbol sequences which ensure level transition between symbols according to the FM0 encoding;

FIG. 3c shows a schematic view of a FM0 extended preamble.

FIG. 3d shows four different pulse shapes (bases functions) used for representing data-0 and data-1 according to Miller encoding;

FIG. 3e shows a state diagram of a Miller-signaling;

FIG. 3f shows a schematic view of a Miller extended preamble;

DETAILED DESCRIPTION OF THE INVENTION

Figure 1:
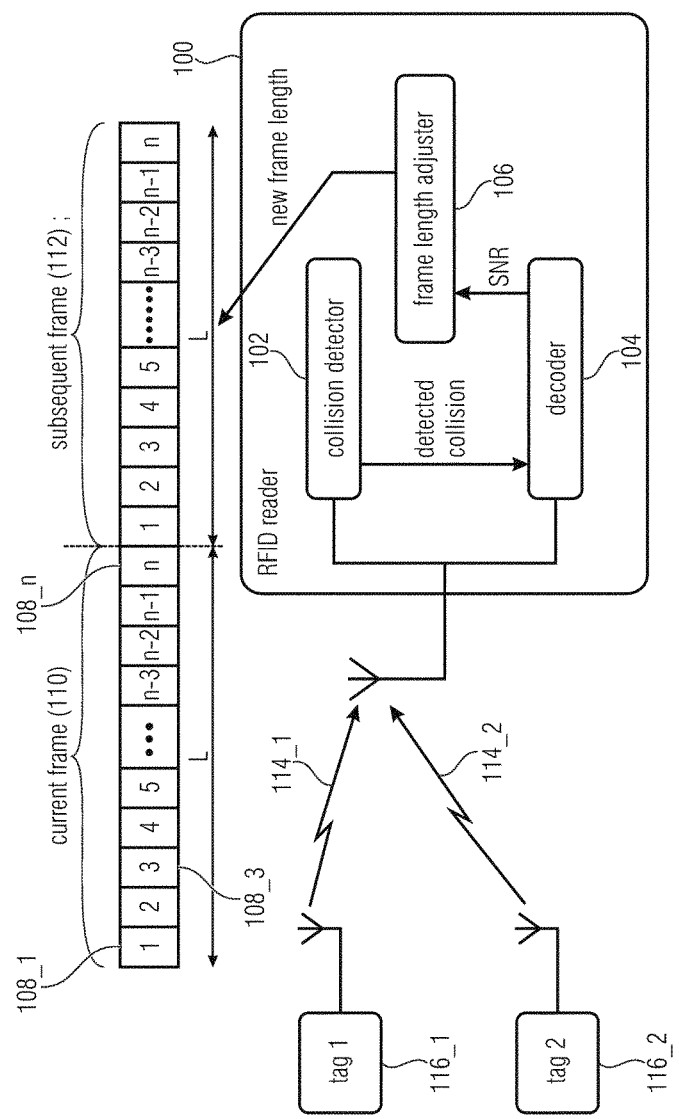
FIG. 1 shows a schematic block diagram of an RFID reader according to an embodiment of the present invention.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other unless specifically noted otherwise.

FIG. 1 shows a schematic block diagram of an RFID reader 100 and an schematic view of a current frame 110 and a subsequent frame 112. The RFID reader 100 comprises a collision detector 102, a decoder 104 and a frame length adjuster 106. The collision detector 102 is configured to detect for each slot of a plurality of slots 108_1 to 108_n of the current frame 110 a collision of signals 114_1 and 114_2 transmitted by at least two RFID tags 116_1 and 116_2. The decoder 104 is configured to decode for the slot in which the collision is detected one of the signals 114_1 and 114_2 transmitted by the at least two RFID tags 116_1 and 116_2, wherein a collision recover probability $\alpha_i$ describing a probability that the decoder 104 can accurately decode the one signal depends on a signal-to-noise ratio (SNR) of the current frame 110. The frame length adjuster 106 is configured to adjust a frame length L of the subsequent frame 112 in dependence on the collision recover probability $\alpha_i$.

In the example shown in FIG. 1, the two RFID tags 116_1 and 116_2 transmit their signals in the same slot, for example, in the slot 108_3, of the current frame 110. In that case, the collision detector 102 will detect a collision of the signals 114_1 and 114_2 transmitted by the two RFID tags 116_1 and 116_2 in the slot 108_3. The decoder 104 will (try) to decode for the slot 108_3 one of the signals 114_1 and 114_2 transmitted by the two RFID tags 116_1 and 116_2. The probability that the decoder 104 can accurately decode the one signal, for example, the signal 114_1 transmitted by the RFID tag 116_1, depends on the signal-to-noise ratio (SNR) of the corresponding slot and on how many tags transmitted signals in this slot. If the decoder 104 can accurately decode the one signal (e.g., the signal 114_1 of RFID tag 116_1), than the corresponding tag (e.g., RFID tag 116_1) does not have to transmit the signal again in the subsequent slot 112. In contrast to that, if the decoder 104 can not accurately decode the one signal (e.g., the signal 114_1 of RFID tag 116_1), than the corresponding tag (e.g., RFID tag 116_1) has to transmit the signal again in the subsequent slot 112. Therefore, the RFID reader 100 comprises the frame length adjuster 106 that is configured to adjust a frame length L (=number of slots) of the subsequent frame 112 in dependence on the collision recover probability $\alpha_i$ (and thus in dependence on the (average) signal-to-noise ratio of the current frame).

It is noted, that the collision recover probability $\alpha_i$ may vary from frame to frame, e.g., in dependence on the signal-to-noise ratio. Therefore, the frame length adjuster 106 can be configured to determine the frame length L per frame, i.e. for each subsequent frame. For example, the frame length adjuster 106 can be configured to adjust a frame length of a second frame (e.g. subsequent frame) in dependence on the collision recover probability determined in dependence on a signal-to-noise ratio of a first frame (e.g. current frame), and to adjust a frame length of a third frame in dependence on the collision recover probability determined in dependence on a signal-to-noise ratio of the second frame, and (optionally) to adjust a frame length of a fourth frame in dependence on the collision recover probability determined in dependence on a signal-to-noise ratio of the third frame. In other words, the frame length adjuster 106 can be configured to determine a frame length of a m-th frame in dependence on the collision recover probability determined in dependence on a signal-to-noise ratio of the m−1-th frame, wherein m is a natural number equal to or greater than two.

In embodiments, the decoder 104 can be configured to decode for the slot in which the collision happened the signal of the signals 114_1 and 114_2 transmitted by the at least two RFID tags 116_1 and 116_2 having the greatest signal strength. In that case, the frame length adjuster can be configured to determine the collision recover probability $\alpha_i$ describing a probability that the decoder can accurately decode the signal having the strongest signal strength in dependence on the signal-to-noise ratio of the current frame 110.

Thereby, the frame length adjuster 106 can be configured to determine the collision recover probability $\alpha_i$ per frame (and in thus also in dependence on the per frame determined collision recover probability $\alpha_i$ the frame length L per frame).

Further, the frame length adjuster can be configured to adjust the frame length L of the subsequent frame 112 further in dependence on a collision probability $P_{col}(i)$ describing the probability of the collision of the signals 114_1 and 114_2 transmitted by the at least two RFID tags 116_1 and 116_2, i.e. describing the possibility that at least two RFID tags 116_1 and 116_2 transmit signals 114_1 and 114_2 in the same slot.

Moreover, the frame length adjuster 106 can be configured to determine a reading efficiency $\eta_{DCR}$ of the RFID reader 100 in dependence on the collision probability $P_{col}(i)$ and the determined collision recovery probability $\alpha_i$. Thereby, the frame length adjuster 106 can be configured to adjust the frame length L of the subsequent frame 112 using the reading efficiency $\eta_{DCR}$. In detail, the frame length adjuster 106 can be configured to adjust the frame length L of the subsequent frame 112 such that the reading efficiency $\eta_{DCR}$ of the RFID reader 100 is maximized or at least increased (e.g., 98%, 95%, 90% or 85% of a maximum value of the reading efficiency).

As already mentioned, the RFID reader 100, or more precisely the decoder 104, can be configured to decode for the slot in which the collision is detected one of the signals 114_1 and 114_2 transmitted by the at least two RFID tags 116_1 and 116_2. Thus, the RFID reader 100 comprises variable collision resolving capabilities. These capabilities depend on the signal-to-noise ratio (SNR) of the received signals, and hence affect the value of the optimum frame length. The reader measures the signal to noise ratio (SNR) of each slot and then get the average SNR of the frame to determine the corresponding collision recovery probability.

In the following, an exemplarily collision recovery algorithm (which can be implemented in the RFID receiver 100 shown in FIG. 1) for the EPCglobal Class-1 Gen-2 standard is described. The collision recovery algorithm can resolve the strongest tag reply from two, three, and four (or more) collided tags without any need for channel estimation.

In other words, subsequently a collision recovery receiver is proposed to recover the strongest tag in the collided slot. The collision recovery receiver does not need any channel state information (CSI) to recover the strongest tag.

Figure 2C:
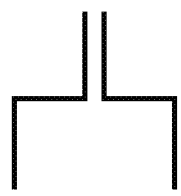
FIG. 2c shows in a diagram antipodal basis functions used for reconstructing the received signal.
Figure 2D:
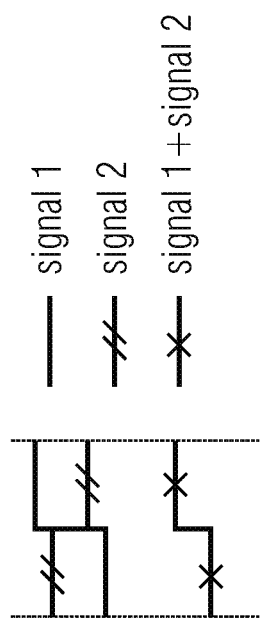
FIG. 2d shows in a diagram a collision of two signals transmitted by two tags and the resulting (superimposed) received signal.
Figure 2A:
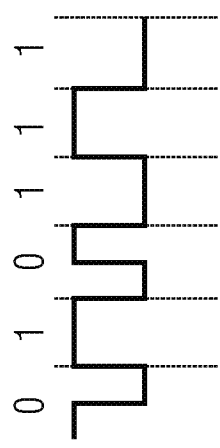
FIG. 2a shows in a diagram a signal received by the RFID reader in case of an exemplarily FM0 tag reply.
Figure 2B:
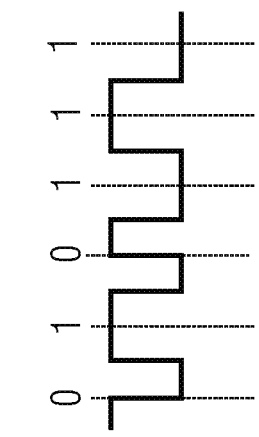
FIG. 2b shows in a diagram the received signal shifted by half symbol.

Based on the RFID standard [EPC radio-frequency protocols class-1 generation-2 UHF RFID protocol for communications at 860 MHz 960 MHz version 1.1.0 2006] the tag uses FMO or Miller to encode its reply. FIG. 2a shows for FMO tag reply. In [M. Simon and D. Divsalar, "Some interesting observations for certain line codes with application to RFID," IEEE Transactions on Communications, vol. 54, pp. 583-586, April 2006], the authors proposed the following steps to decode the received signal:

shift the received signal by half symbol as shown in FIG. 2b;

reconstruct the received signal using antipodal basis functions shown in FIG. 2c; and decode the reconstructed signal again using the normal basis functions of the FMO/Miller.

This decoding algorithm decodes only a single tag reply. In contrast to that, the proposed algorithm (which can be implemented in the RFID reader 100) comprises several modifications, as will become clear from the following discussion. Assuming a collision of two signals, the collision recovery algorithm will be:

shift the received signal by half symbol;

assume that the received signal power of signal 1 is higher than signal 2. So, the result of the collision will be as shown in FIG. 2d;

correlate the received signal with the antipodal basis functions shown in FIG. 1c, and then reconstruct the signal.

the reconstructed signal will follow the shape of the strongest signal, which is in the present example signal 1; and decode the reconstructed signal again using the normal basis functions of the FMO/Miller.

This method could be applied without any knowledge of the channel state information (CSI), and could be applied for more than two collided tags. Moreover, this proposed collision recovery algorithm can be applied for the non synchronous tag reply. However, we have to know the rate of the strongest tag reply. The rate estimation could be done using FFT on the preamble part of the tag reply, as will be described in the following.

The rate estimation in RFID reader receivers plays a significant role for the stability and the efficiency of RFID systems. RFID readers have to estimate the rate of the tag reply, i.e. the so-called backscatter link frequency (BLF). According to the focused EPCglobal Class-1 Gen-2 standard, the BLF can have a variation of up to +/−22%. Most literature uses time domain algorithms to estimate this BLF. However, the proposed techniques are not suitable to estimate the rate when multiple tags reply simultaneously to the reader. In case of such tag collision embodiments utilize the frequency domain representation of the replies to estimate the BLF. The performance is tested with different rates and the both supported modulation techniques, i.e. FMO and Miller. Simulation results show the high performance of utilizing the FFT for estimating the BLF. This especially holds in case of collisions that cannot be easily estimated by means of time domain algorithms.

In the recent years, as RFID technology became more popular, more challenges have been met by designers of RFID readers. In typical applications RFID readers have to communicate with multiple tags to be identified in a short time. RFID tags transmit their IDs in different time slots, while diversities of transmitted signals from different tags, mainly on power and data rates, may affect the stability and efficiency of RFID reader receivers severely [P. Wei, B. Li, Y. Yang, H. Min, and J. Wang, "Synchronization with timing recovery loop in UHF RFID reader receivers," in 17th IEEE International Conference on Electronics, Circuits, and Systems (ICECS), 2010, pp. 1148-1151, December 2010]. In UHF RFID systems, the data rate variations are much more crucial than in other communication systems. These data rate variations arise from two reasons that can not be avoided in practical systems. Firstly, low cost RFID tags use a slow system clock for the digital baseband operation, resulting in a measurement error for the parameters that are transmitted by the reader to determine the tag data rate. In the EPCglobal Class-1 Gen-2 RFID protocol, this tag reply rate is called Backscatter Link Frequency (BLF) ["EPC Radio-Frequency Identity Protocols Class-1 Generation-2 UHF RFID Protocol for Communications at 860 MHz-960 MHz version 1.2.0," EPCglobal Inc., 2007.]. Secondly, the tag clock frequency is usually affected by manufacturing process variations, which also contribute to the BLF variations. Based on the standard, a maximum BLF tolerance of ±22% is allowed with a BLF range from 40 kHz to 640 kHz. Time limitation adds an extra challenge for the design of the synchronization module. After receiving the reply from the tag, the RFID reader is necessitated to give a response within 20 Tpri where $T_{pri}=1/$ BLF ["EPC Radio-Frequency Identity Protocols Class-1 Generation-2 UHF RFID Protocol for Communications at 860 MHz-960 MHz version 1.2.0," EPCglobal Inc., 2007]. At the highest BLF, the operation time left for the whole reader is about 31.25 μs, and only a part of it is left for the synchronization. This puts a limit on the use of some complicated rate estimation algorithms.

Several rate estimation algorithms have been proposed to compensate the BLF variations in RFID systems. All these algorithms are used to estimate the BLF during a single tag reply. However, nobody tried to address the rate estimation if more than one tag replies in the same slot, i.e. in case of a collision. Many algorithms have been presented to recover at least one tag from a collision. However, all these algorithms assume that the BLF of all tags are perfectly synchronized.

Liu and Huang et al. [Y. Liu, C. Huang, H. Min, G. Li, and Y. Han, "Digital correlation demodulator design for RFID reader receiver," in IEEE Wireless Communications and Networking Conference, 2007.WCNC 2007., pp. 1664-1668, March 2007] presented a rate estimation algorithm based on 12 preamble correlation banks, followed by an early late technique. The BLF range is specified by the correlator that returns the maximum value. Their implementation performs well in applications that are using high rates. For slow rates, the bad performance is compensated using the early late algorithm. For this reason, this technique is not suitable for estimating the rate of a tag in a collided slot. Angerer et al. [C. Angerer and M. Rupp, "Advanced synchronisation and decoding in RFID reader receivers," in IEEE Radio and Wireless Symposium, 2009. RWS '09., pp. 59-62, January 2009] and Wang et al. [Y.-Y. Wang and J.-T. Chen, "A baseband signal processing scheme for joint data frame synchronization and symbol decoding for rfid systems," EURASIP J. Adv. Signal Process, vol. 2010, pp. 53:1-53:11, February 2010] proposed new algorithms with lower complexity than [Y. Liu, C. Huang, H. Min, G. Li, and Y. Han, "Digital correlation demodulator design for RFID reader receiver," in IEEE Wireless Communications and Networking Conference, 2007.WCNC 2007., pp. 1664-1668, March 2007]. However, also they are not suitable for the rate estimation of collided slot as they depend on the rate estimation in the time domain.

Embodiments provide a rate estimation technique based on the Fast Fourier Transform (FFT) to estimate the rate of a single tag reply, or of the strongest tag from multiple simultaneous tag replies. The technique is tested for a single tag reply and for up to four collided tags. A comparison between the performance of the algorithm at low BLF (i.e. 40 kHz), and high BLF (i.e. 640 kHz) is presented. Furthermore, the effect of the modulation technique of the tag on the rate estimation accuracy is studied. Moreover, the Percentage of Failure (PoF) is used as a performance metric to compare the results.

Subsequently, the EPCGlobal Class-1 Gen-2 is described. The EPCglobal Class-1 Gen-2 standard is a framework for RFID communications, defined by the EPC global (Electronic Product Code) organization ["EPC Radio-Frequency Identity Protocols Class-1 Generation-2 UHF RFID Protocol for Communications at 860 MHz-960 MHz version 1.2.0," EPCglobal Inc., 2007.]. According to the standard, the nominal symbol duration value depends on the tag reply encoding technique. It is a multiple of the inverse of the BLF. In case of FMO encoding, the symbol period is related to the BLF by: T=1/BLF as shown in FIGS. 3a-c. Based on the EPCglobal standard, the nominal value of the BLF is adjusted between 40 kHz and 640 kHz, with a maximum variation from the nominal value of up to ±22%. The calculation of the BLF is determined by two parameters in the so-called Query command of the reader. These two parameters are tag to reader calibration (TRcal), which is a field in the preamble of the Query command, and the divide ratio (DR), which is a field in the Query command itself:

$$BLF = \frac{DR}{TRcal}$$

Above equation shows the nominal value of the BLF from the reader parameters. To avoid problems with BLF uncertainties, the EPCglobal standard specifies the frequency uncertainty for different BLF settings as shown in the table 1 below. The tag has to measure the value of TRcal to determine the BLF. Thus, the tolerance is coming from this measurements, so for shorter TRcal, a higher relative error would occur in the BLF.

TABLE 1

| DR: Divide Ratio | Trcal (μs) | BLF (kHz) | Frequency Tolerance |
|---|---|---|---|
| 64/3 | 33.3 | 640 | ±15% |
| | 66.7 | 320 | ±10% |
| | 38.3 | 256 | ±10% |
| 8 | 50 | 160 | ±7% |
| | 84.2 | 95 | ±4% |
| | 200 | 40 | ±4% |

According to the EPCglobal standard, the pulse shapes $s_n(t)$ follow an FM0 (bi-phase space), or Miller encoding. As the FM0 encoding offers the higher data rate, most of the readers use this encoding scheme. In FM0 encoding, the pulse shapes $s_n(t)$ for the symbols are selected among four pulse shapes as shown in FIG. 3a, where $s_0(t)$ and $s_1(t)$ s1(t) represent data-0 and $s_2(t)$ and $s_3(t)$ represent data-1. The symbols are arranged to feature a level transition at each boundary. For example, the pulse $s_0(t)$ can only be followed by $s_0(t)$ or $s_2(t)$, but not by the symbol $s_1(t)$ or $s_3(t)$ to keep the feature of a level transition between symbols as shown in FIG. 3b.

The extended version from the preamble of FM0 has a 12 leading zeros as shown in FIG. 3c. This part of the preamble is used as a pilot tone to estimate the rate of the tag reply.

FIG. 3d shows the basis functions and FIG. 3e shows the state diagram in case of the Miller encoding. Baseband Miller inverts its phase between two data-0s in sequence. It also places a phase inversion in the middle of a data-1 symbol. The state labels, $s_1(t)$-$s_4(t)$, indicate four possible Miller-encoded symbols, represented by the two phases of each of the Miller basis functions. The transmitted waveform is the baseband waveform multiplied by a square-wave at M times the symbol rate. The tag to reader sub-carrier signaling begins with one of two preambles. One has an extended pilot tone of length 16M/BLF as shown in FIG. 3d and the other one has a pilot tone of length 4M/BLF. Although using Miller as an encoding scheme means reducing the rates, as the symbol rate equals to BLF/M, the extended preamble of the Miller encoding is long enough to estimate the rate accurately. The length of the pilot tone of the extended preamble reaches to 128/BLF at M=8, so it is 10 times longer than the length of the pilot of FM0.

As will become clear from the following discussion, embodiments use the FFT to estimate the rate of the RFID tag reply based on the knowledge of the nominal value of the tag BLF. The FFT can be applied on the part of the preamble that contains the pilot tone. This method can be used either when a single tag replies (successful slot), or when multiple tags reply simultaneously (collided slot). In case of a collided slot, we are only interested in the rate of the strongest tag.

Figure 4:
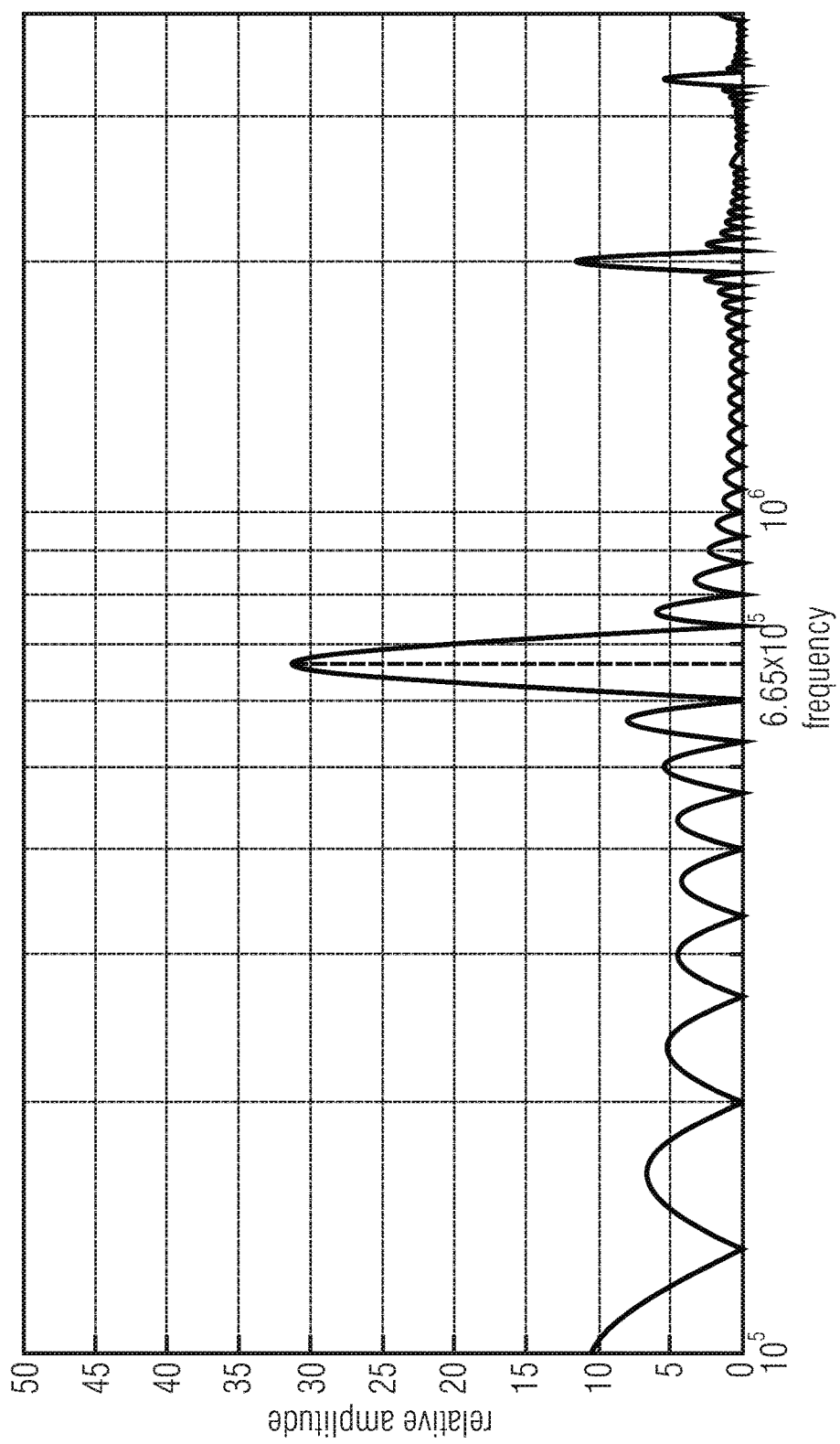
FIG. 4 shows in a diagram a frequency response of the pilot tone of FM0 encoding at nominal BLF=640 kHz and a tolerance of 5.4%.

First, the rate estimation in case of a single tag reply is described. The tag reply rate estimation in RFID is a challenging research point. When a single tag replies to the reader, the rate can be estimated in the time domain [C. Angerer and M. Rupp, "Advanced synchronisation and decoding in RFID reader receivers," in IEEE Radio and Wireless Symposium, 2009. RWS '09., pp. 59-62, January 2009], [Y.-Y. Wang and J.-T. Chen, "A baseband signal processing scheme for joint data frame synchronization and symbol decoding for RFID systems," EURASIP J. Adv. Signal Process, vol. 2010, pp. 53:1-53:11, February 2010], [Y. Liu, C. Huang, H. Min, G. Li, and Y. Han, "Digital Correlation Demodulator Design for RFID Reader Receiver," in IEEE Wireless Communications and Networking Conference, 2007. WCNC 2007, pp. 1664-1668, 2007], or in the frequency domain. The advantage of using the time domain is the speed and its simplicity. However, it can not be easily extended when collisions occur. The frequency domain representation can be utilized to estimate the rate either if a collision occurs or not. The reader knows the nominal value of tag reply BLF, and also knows the maximum tolerance as shown in table 1. From the knowledge of the start and the type of the preamble and the rough sampling rate, the reader can successfully apply the FFT on the pilots of the preamble. Then, we can get the peak of the spectrum in the expected range of frequencies. This peak directly corresponds to is the estimated rate as shown in FIG. 4. After estimating the rate, the reader can estimate the number of samples per symbol easily.

Figure 5:
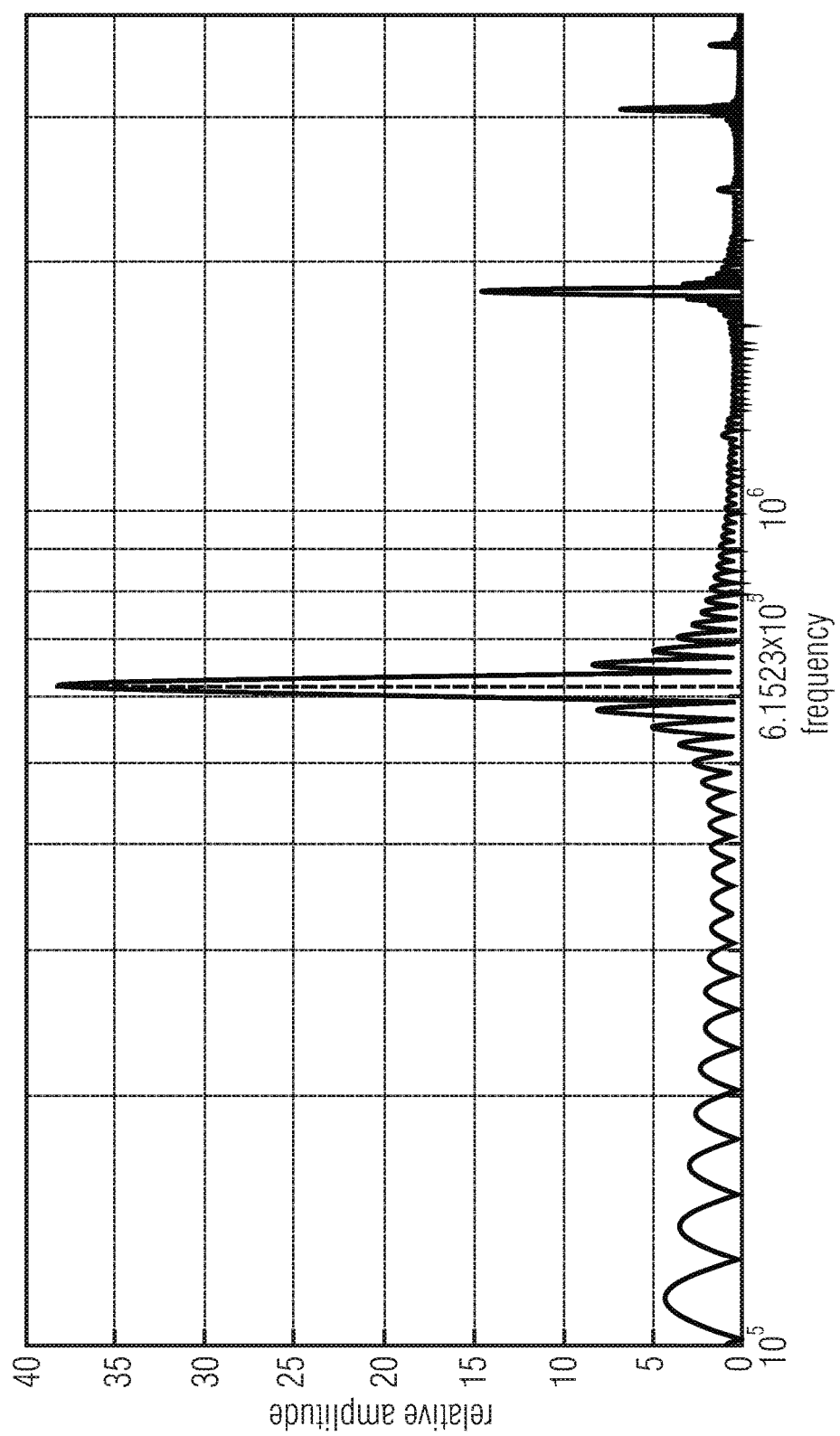
FIG. 5 shows in a diagram a frequency response of the pilot tone of Miller encoding at nominal BLF=640 kHz, a tolerance of −4.5%, and M=2.

When Miller encoding is used by the tag, it can take three options, i.e. M=2, 4, 8. For higher values of M the main peak gets sharper, as the length of the preamble increases. FIG. 5 shows the effect of using Miller on the frequency response of the pilot tones. At M=2, the length of the pilot tones is 32/BLF when the extended version of the preamble is used. Further, FIG. 5 shows that the side lobes of Miller are smaller than the side lobes of FM0. Also the main peak is narrower, which gives better estimation performance, with the drawback of a lower rate.

Figure 6:
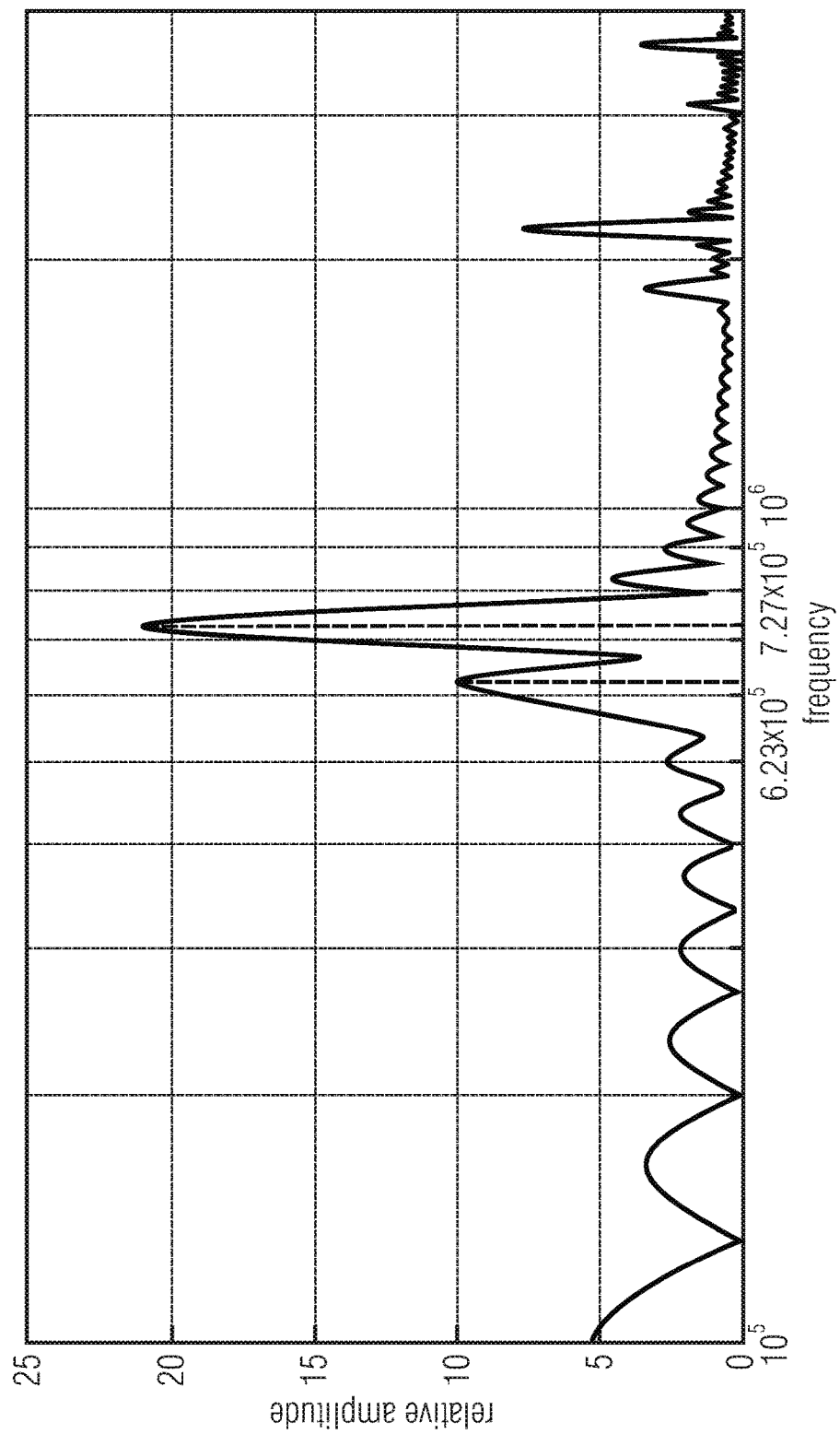
FIG. 6 shows in a diagram a frequency response of the pilot tone of two collided tags using FM0 as encoding scheme at nominal BLF=640 kHz, a tolerance of −3.7% and 11.6%.

Second, the rate estimation in case of multiple tags replies is described. Significant efforts were exerted in the area of collision recovery in RFID systems. The problem in the collision recovery is the channel and the rate estimation of the collided tags. Angerer et. al. [C. Angerer, R. Langwieser, and M. Rupp, "RFID reader receivers for physical layer collision recovery," IEEE Transactions on Communications, vol. 58, pp. 3526-3537, December 2010] proposed a channel estimation technique suitable for two collided tags only. However, they did not consider the rate variations between the tags in their model. Anyway, it is not necessitated to recover all collided tags in a collided slot. Based on the EPCglobal standard, the reader can only acknowledge one tag per slot. Thus, the recovery of multiple tag replies in one slot does not offer any gain. Hence, in our proposal, we focus on the rate estimation of the strongest tag only. If two or more tags are collided, the rate of the strongest tag is estimated by the same algorithm that we used before for the estimation of the single tag. This leads to the frequency domain representation as shown in FIG. 6.

Figure 7:
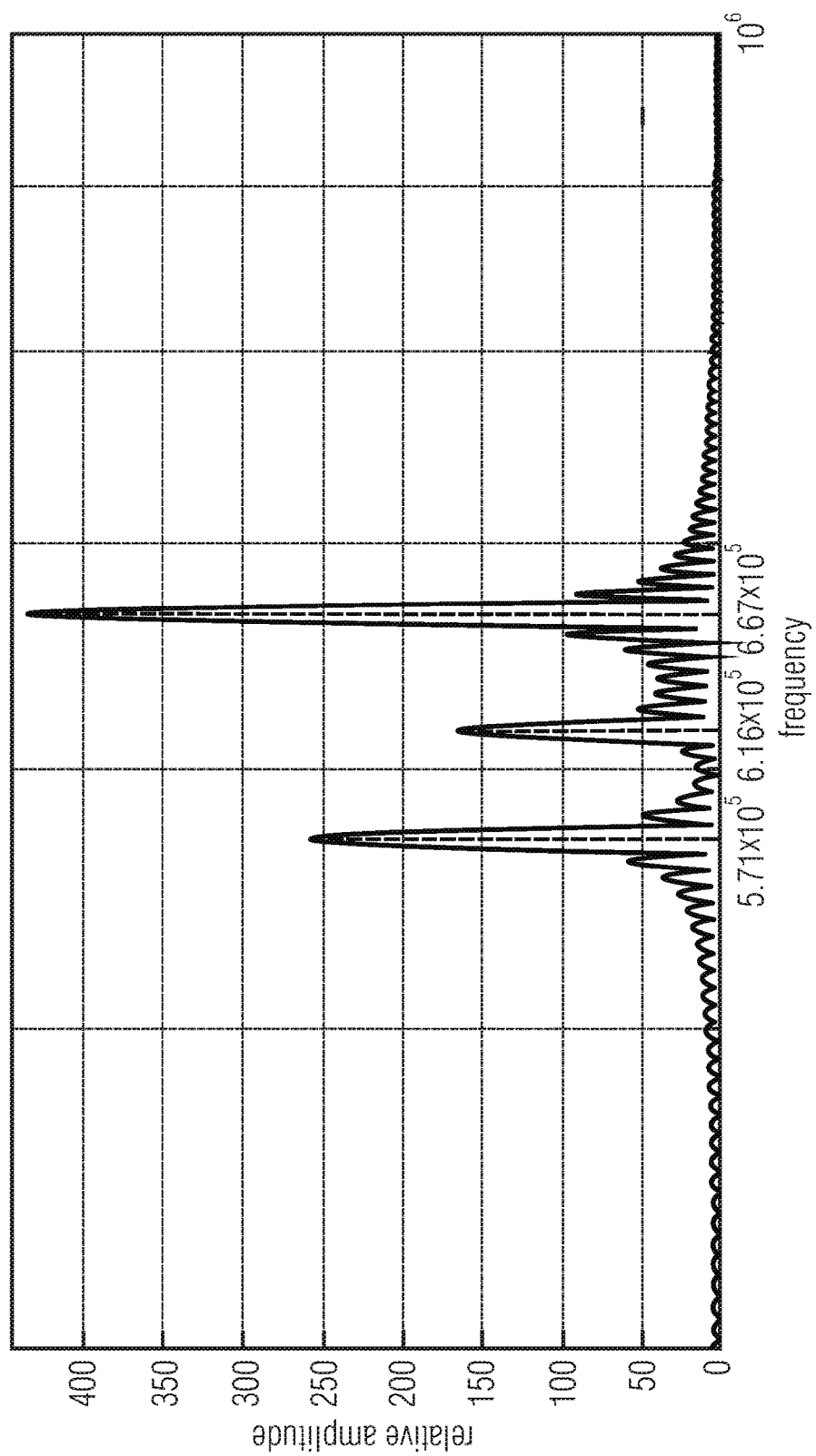
FIG. 7 shows in a diagram a frequency response of the pilot tone of three collided tags using Miller as an encoding scheme at nominal BLF=640 kHz, M=8, and a tolerance of −3.75%, 4.2%, and 10.7%.

When more than two tags collide, and all of them have completely different rates, the algorithm still works well as shown in FIG. 7. However, the estimation of the strongest tag may fail, if multiple tags have almost identical rates and their signals sum up in the frequency domain. Because of this effect the Miller encoding shows some benefits. Using Miller leads to sharper lobes, and the probability of an overlap in the frequency domain reduces.

In order to evaluate the performance of the proposed rate estimation technique, the Percentage of Failure (PoF) was simulated using Monte Carlo simulations. The normalized dyadic backscatter Rayleigh channel is used as a channel model [J. Griffin and G. Durgin, "Gains for rf tags using multiple antennas," IEEE Transactions on Antennas and Propagation, vol. 56, pp. 563-570, February 2008]. The used sampling rate equals to 8 MSps. In all simulations, it was assumed that the error follows normal distribution with zero mean and variance equals to (maximum tolerance/3)$^2$, i.e. according to table 1, if the BLF equals to 640 kHz, the variance equals to 0.025.

Figure 8:
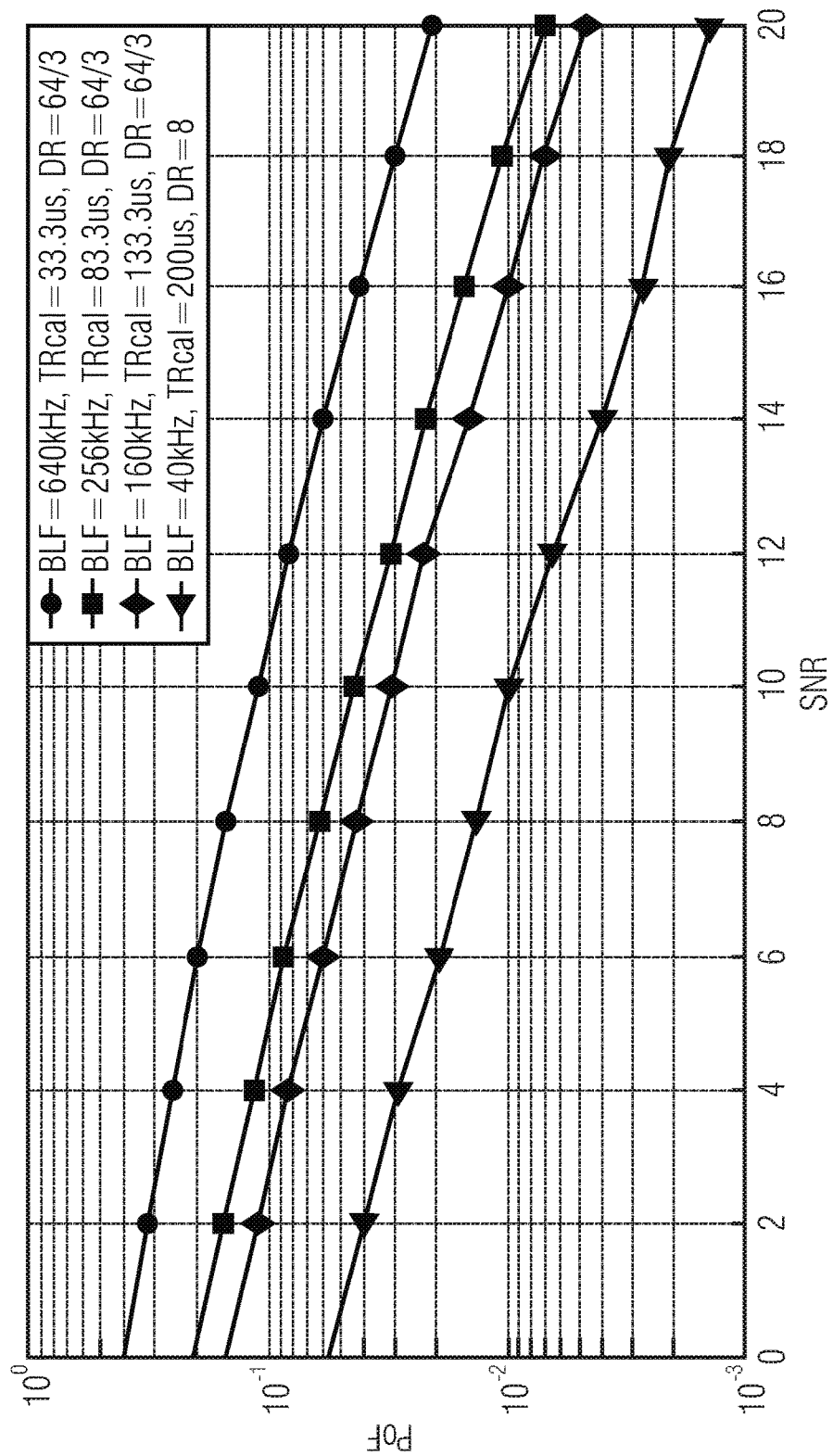
FIG. 8 shows in a diagram a packet error ratio in backscatter Rayleigh fading channel in successful slots with three different BLFs using FM0.

FIG. 8 shows the performance of the rate estimation technique for four different BLFs; 640 kHz, 256 kHz, 160 kHz, and 40 kHz using FM0. According to the EPCglobal standard, as the rate increases, the tolerance increases as the relative error during the TRcal measurement by the tag increases. Also when then BLF increases the bandwidth of the main lobes increases, and this affects the estimation performances. In the simulation, we assumed that we can recover the packet successfully, if the error in the estimation causes a shift by less half of symbol at the end of the packet. For example, if we are decoding the RN16 (i.e. the response of the tag to the reader) with FM0 encoding, which has a length of 34 bits, the acceptable relative error in the number of samples per symbol equals to 0.5/34. If Miller is used, the number of bits per packet equals to 38 bits for the extended preamble. Thus, the acceptable relative error in the number of samples per symbol equals to 0.5/38 M.

Figure 9:
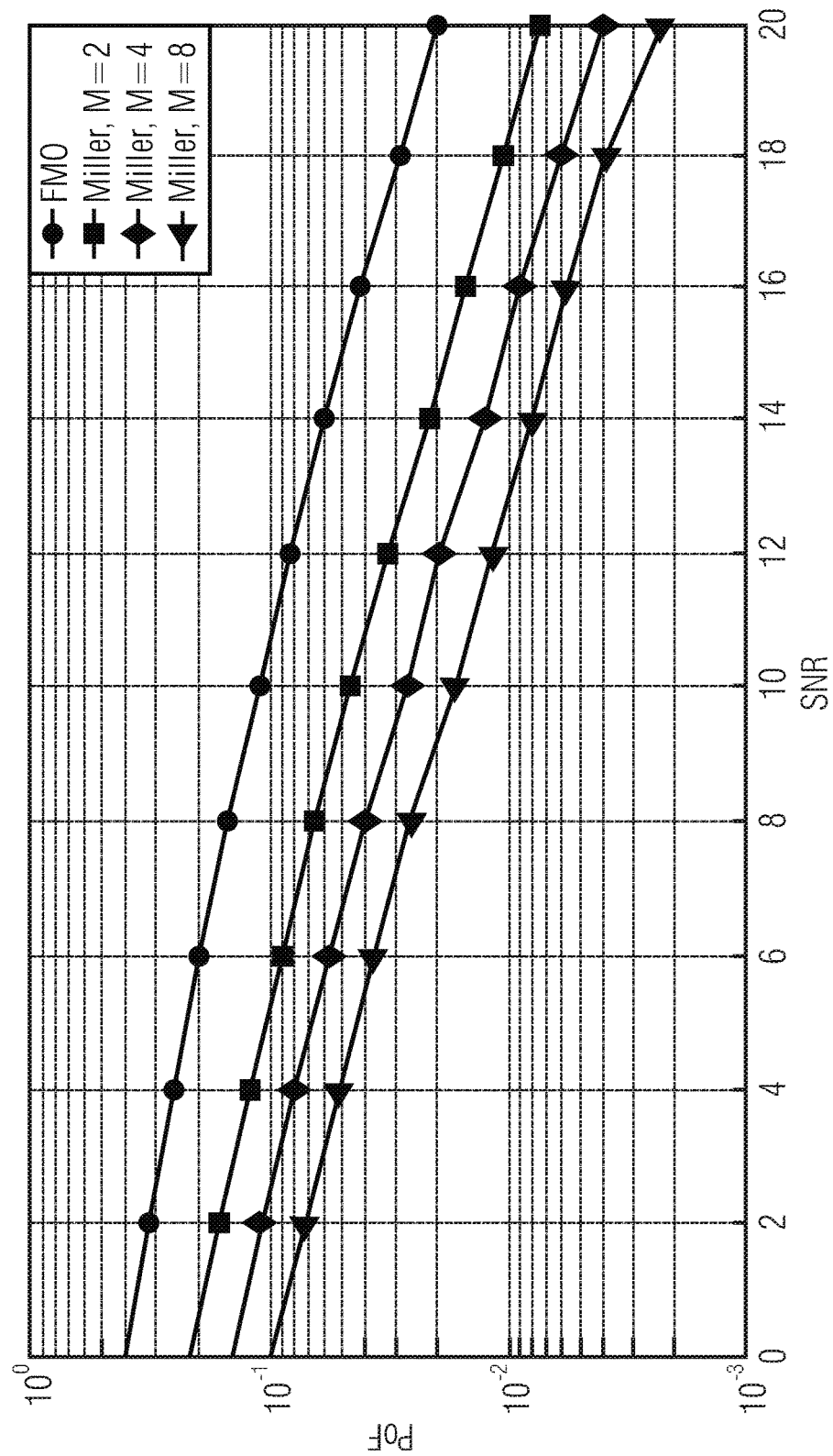
FIG. 9 shows in a diagram a percentage of failure in backscatter Rayleigh fading channel in successful slots with BLF=640 kHz and Miller with M=2, 4, 8.

FIG. 9 indicates the effect of using Miller as an encoding scheme. As M increases, the preamble length increases and the estimation improves. Using Miller gives better performance in the frequency estimation, therefore it would give better performance for the overall system. However using Miller means lower symbol rate, as using FM0, the symbol rate varies from 40 kbps to 640 kbps, but with Miller, the symbol rate varies from 40/M kbps to 640/M kbps.

Figure 10:
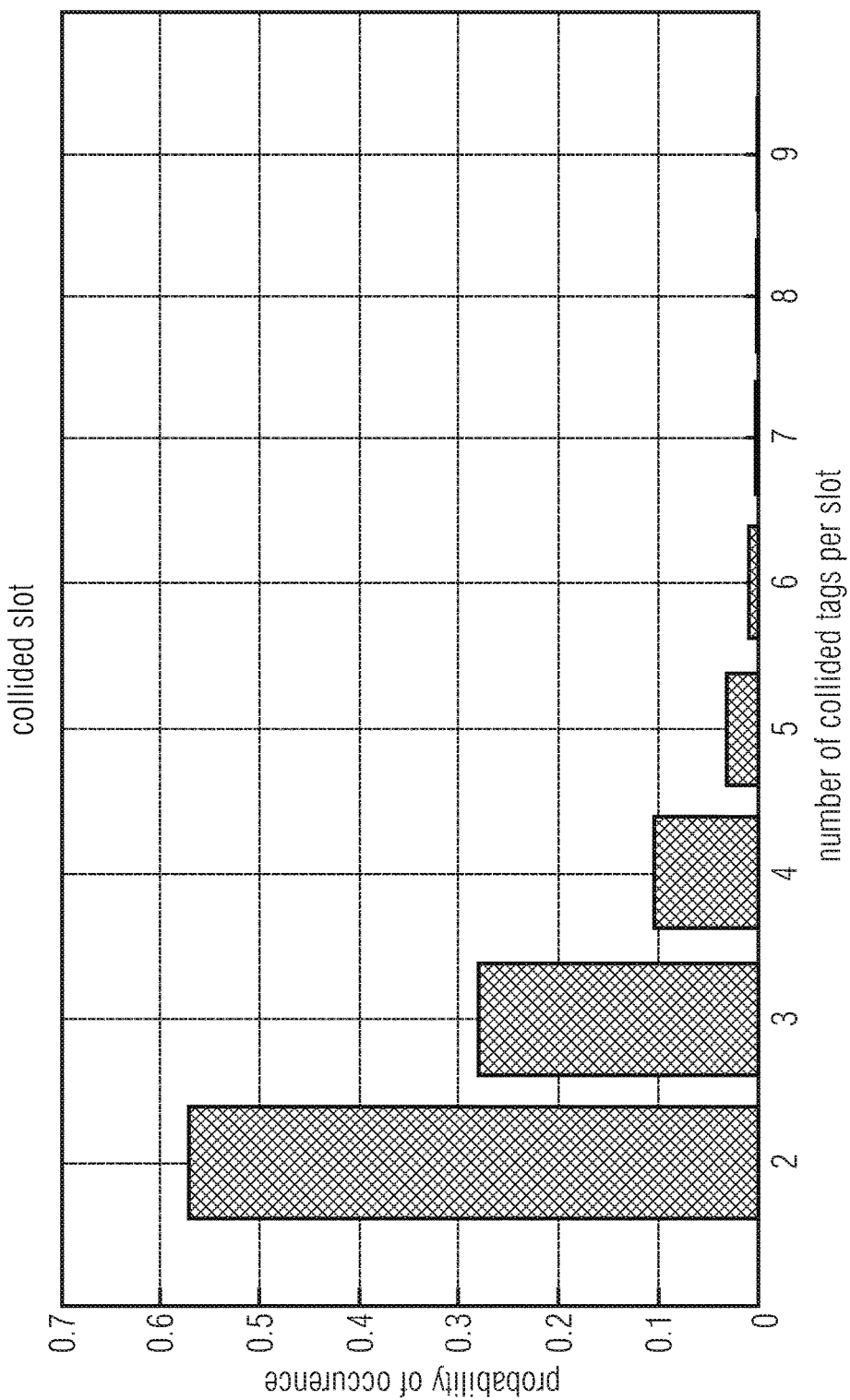
FIG. 10 shows in a diagram a collision distribution.

The main advantage of using the FFT is the ability to estimate the rates of the collided tags. In simulations, the focus is only on estimating the rate of the strongest tag from collided tags, as based on the standard, the reader can only acknowledge one tag per slot. Therefore, there is no need to try to recover all tags while the reader could only acknowledge one tag. Also the focus only the collided slots that have 2, 3, or 4 tags as based on the statistics, the collided slots that have 2, 3, or 4 tags are 96% from the overall collided slots as shown in FIG. 10.

Figure 11:
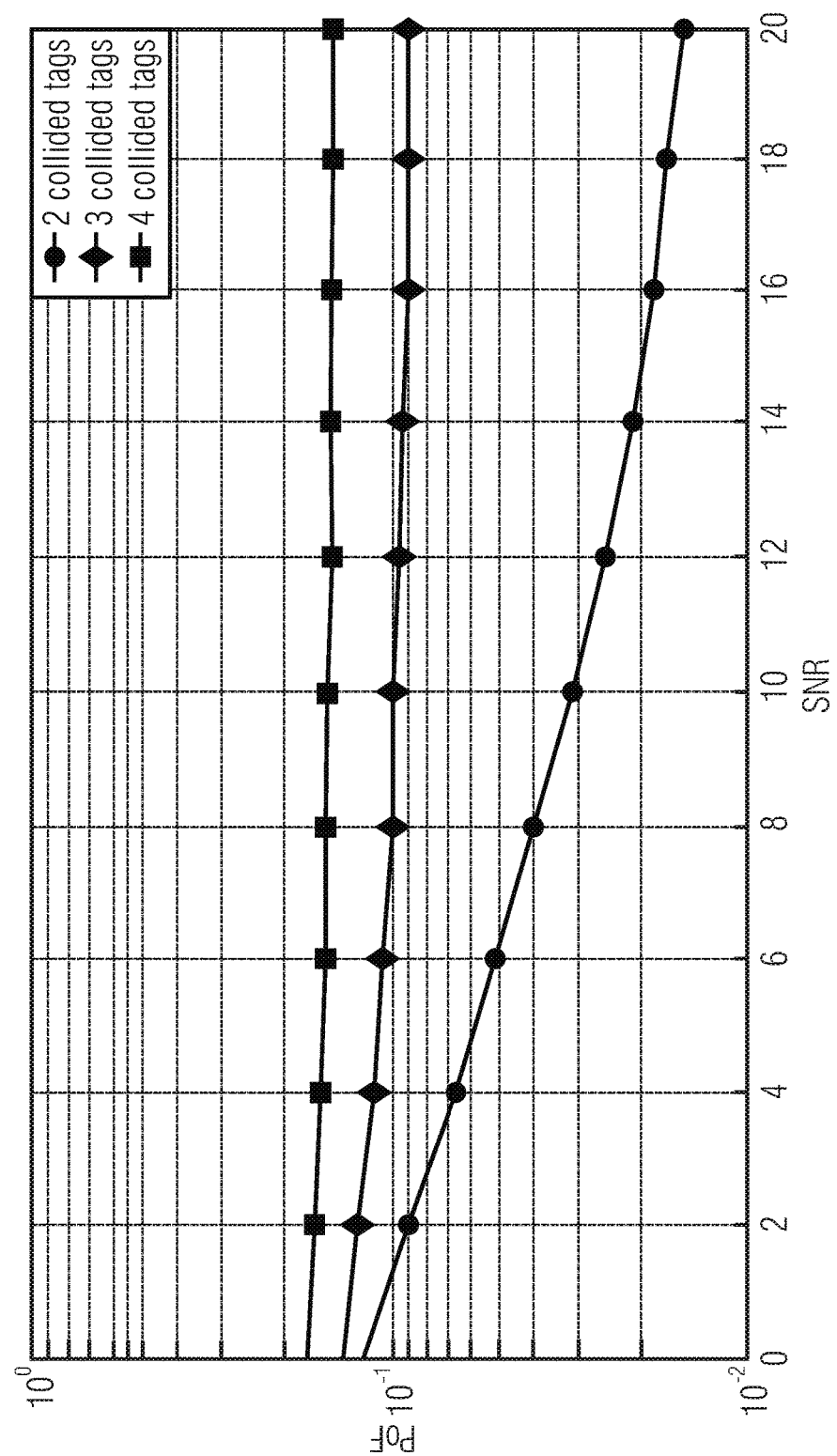
FIG. 11 shows in a diagram a percentage of failure in backscatter Rayleigh fading channel in collided slots with 2, 3, 4 tags using BLF=640 kHz and FM0.

FIG. 11 shows the performance of the rate estimation when a collision occurs using FM0. It is clear that the performance of the estimation algorithm when two tags collide is much better than the performance when three and four tags collide. As for two collided tags, the algorithm work perfectly like in case of a single tag reply. Though, for three and four collided tags the performance quickly saturates for increasing Signal to Noise Ratio (SNR). Here, the performance is given by the interference of the tags itself. When three or four tags collide, there is a probability that two collided tags have a weaker received signal level, but identical BLF. Then, the summation of them may be larger than the received level of the strongest tag. Thus, the BLF of the strongest tag is not properly estimated.

Figure 12:
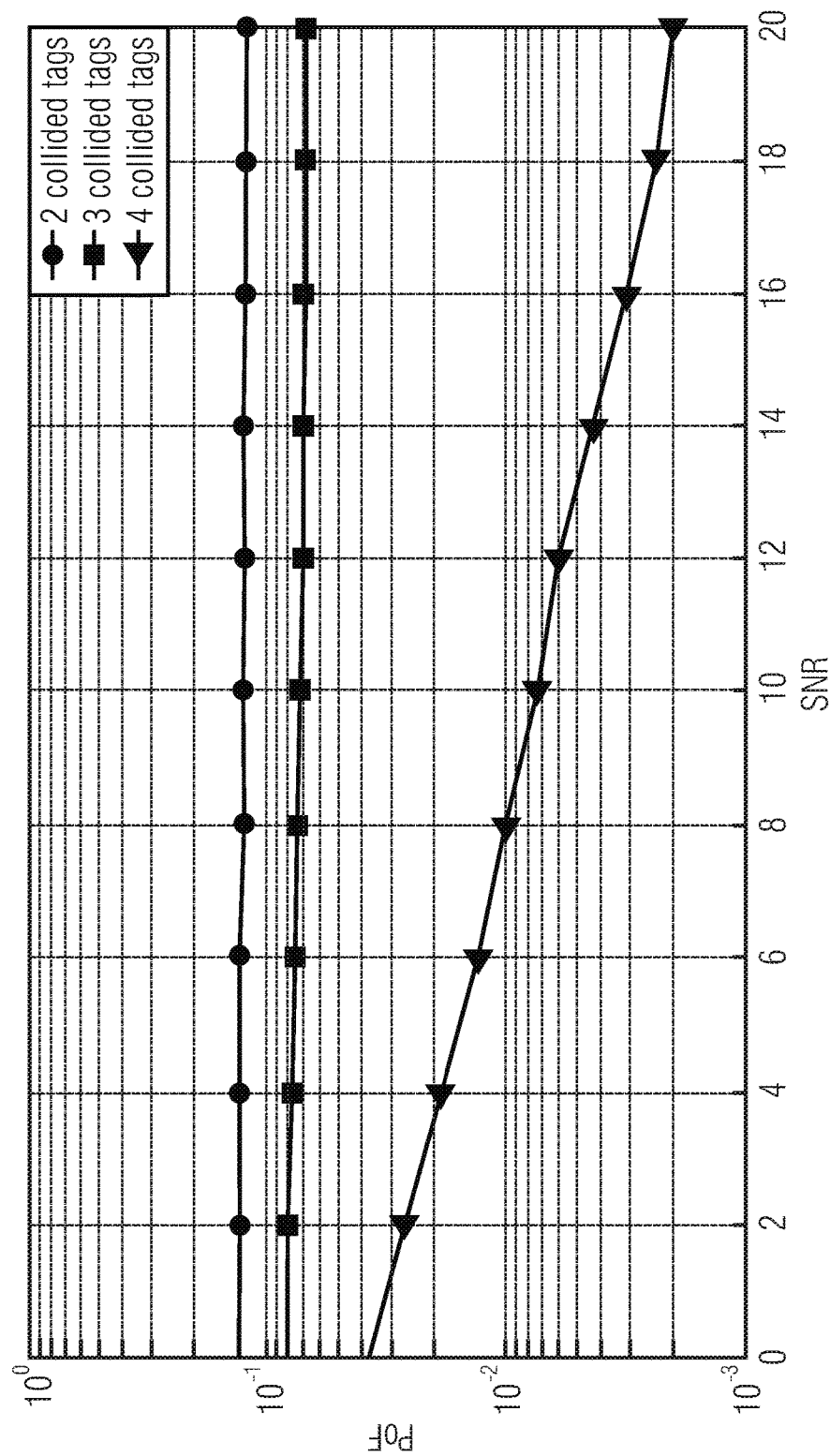
FIG. 12 shows in a diagram a percentage of failure in backscatter Rayleigh fading channel in collided slots with 2, 3, 4 tags using BLF=640 kHz and Miller with M=8.

FIG. 12 shows how the PoF (PoF=percentage of failure) is improved when Miller with M=8 is used. The performance of estimating the rate when two tags collide is improved dramatically, as the main lobe in the frequency domain is steeper. At SNR=10 dB, the PoF=3% when FM0 is used, but it is 0.7% at the same SNR when Miller is used. However, the performance of estimating the rates when three and four tags collide is not improved significantly.

Again, the performance is given is the signal to interference ratio (SIR) not the SNR and changing the modulation scheme improves the SNR not the SIR.

Embodiments use the FFT (FFT=fast Fourier transform) to estimate the rate of the tag reply of an RFID system based on EPCglobal standard. The algorithm mainly depends on getting the maximum peak of the received signal in the frequency domain, and the corresponding frequency is the estimated rate. The FFT is applied only on the part that has the pilot tones in the preamble of the tag reply. Using the frequency domain of the signal is very helpful, especially when multiple tags reply at the same time. The performance of the technique is tested with multiple rates and multiple modulation techniques based on the EPCglobal standard. Simulations show that lower rates have lower PoF than the higher rates at identical SNR. The Miller encoding scheme offers better performance in the rate estimation than FM0 due to its longer preamble. However, the Miller encoding has a significantly lower rate than FM0. Finally, we used the FFT to estimate the rate of the strongest tag when multiple tags reply simultaneously. When two tags collide and the rate of the strongest is estimated, the PoF decreases with increasing the SNR, and it reaches to 1.5% at SNR=20 dB. However, when three or four tags collide, the PoF saturates at 9% and 14.5% for three and four tags respectively. Here, the performance is limited by the interference between the tags. When Miller is used by the tag, the performance of estimating two tags improved significantly and the PoF reaches to 0.2% at SNR=20 dB. Though, the performance of three and four tags nearly remains the same as there is no improvement in the SNR.

Subsequently, referring to embodiments of the RFID reader 100 shown in FIG. 1 and to a method for operating the same, the dynamic collision recovery reading efficiency $\eta_{DCR}$ is described. In embodiments, the dynamic collision recover reading efficiency $\eta_{DCR}$ uses cross layer probability coefficients $\alpha_i$. This coefficients $\alpha_i$ can be fed from the PHY (physical) layer to the MAC layer to adjust the working efficiency and hence the frame length. Using this coefficients $\alpha_i$ the frame length can be optimized which in turn will affect directly the total reading time.

In other words, subsequently a new FSA (frame slotted ALOHA) reading efficiency refered herein as to dynamic collision recovery reading efficiency (DCR) is described. This efficiency contains cross layer probability coefficients $\alpha_i$. These coefficients $\alpha_i$ indicate the ability of the reader to recover i collided tags, where this ability is dynamic based on the powerful of the reader collision recovery and the average SNR for the collided tags. The proposed dynamic collision recovery reading efficiency (DCR) can be expressed as:

$$\eta_{DCR} = P(1) + \sum_{i=2}^{n} \alpha_i P_{col}(i)$$

where, $P_{col}(i)$ is the probability that i tags collided in a slot, n represents the total number of tags in the reading area, and $\alpha_i$ are the cross layer probability coefficients, which were assumed in the literature to be 100%.

In practice the most of the collided slots are either two tags, three tags, or four tags collided slot. FIG. 10 shows the average collision distribution probability in a frame having the length $$\frac{n}{2} \le L \le 2n$$

uniformly. In other words, FIG. 10 shows the collision distribution probability in FSA under condition $$\frac{n}{2} \le L \le 2n.$$

According to FIG. 10, the probability that the collided slot in a frame has two tags ($P_{col}(2)$), three tags ($P_{col}(3)$), or four tags ($P_{col}(4)$) is (approximately) equal to 96%, and the remaining tag collisions $\Sigma_{i=5}^{n} P_{col}(i)=4\%$. Moreover, the ability of the RFID reader 100 to recover the strongest tag reply from more than four collided tags may be very limited.

Therefore, the proposed dynamic collision recovery reading efficiency $\eta_{DCR}$ in the RFID environment can be expressed as follows:

$$\eta_{DCR}=P(1)+\alpha_2 P_{col}(2)+\alpha_3 P_{col}(3)+\alpha_4 P_{col}(4)$$

Figure 13:
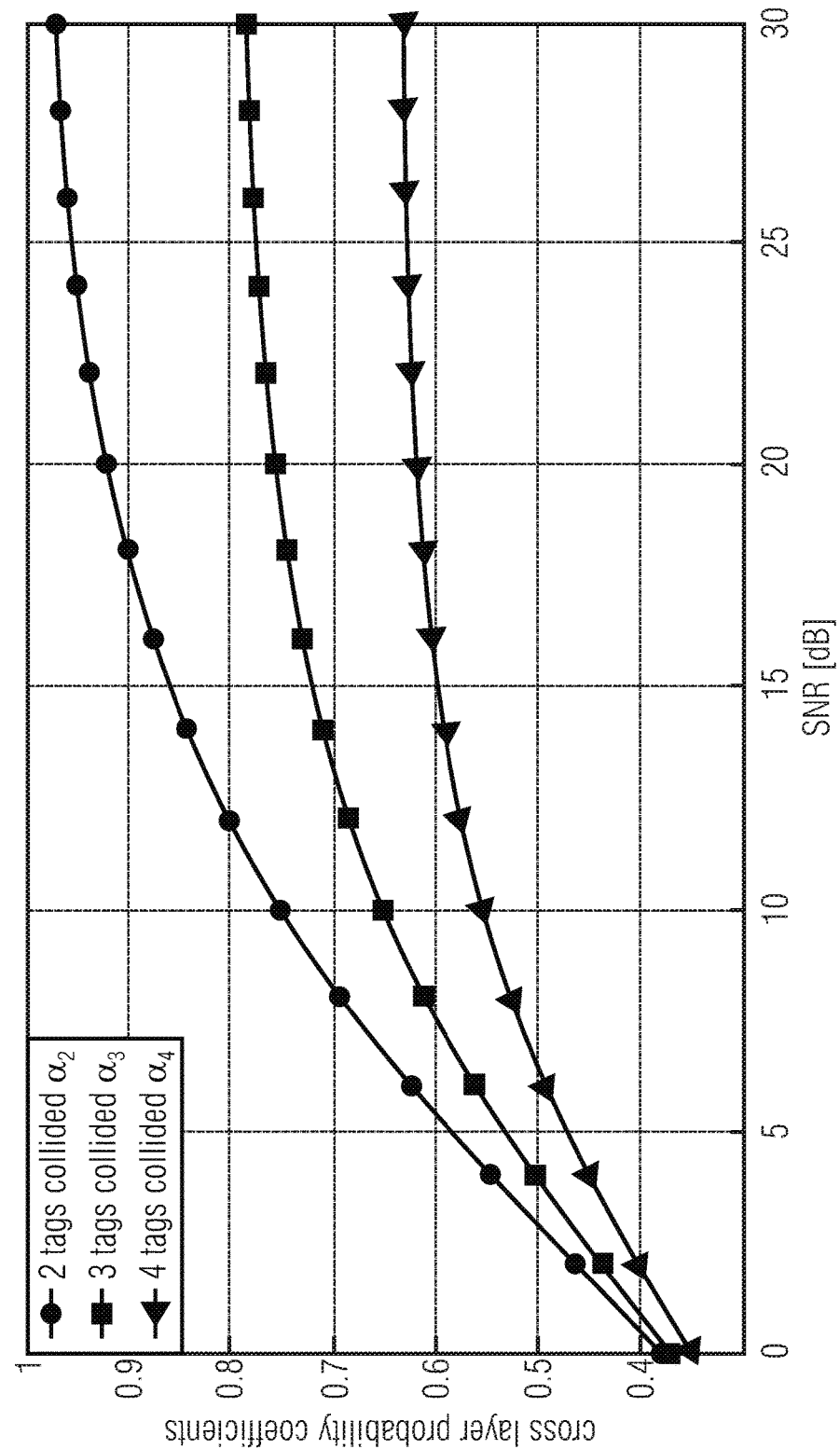
FIG. 13 shows in a diagram curves of collision recovery coefficients for two, three and four collided tags plotted over a signal-to-noise ratio of the current frame.

The values of $\alpha_2$, $\alpha_3$, and $\alpha_4$ are strongly dependent on the type of the RFID receiver 100 and the value of the average signal-to-noise ratio per frame. The SNR is calculated for each slot either the slot is collided slot or successful slot then we get the average value for the SNR for the overall frame. FIG. 13 shows how the values of $\alpha_2$, $\alpha_3$, and $\alpha_4$ varies with the average SNR of the current frame using the proposed collision recovery algorithm, which is discussed above. According to practical measurements of successful tags reply in a real RFID environment, SNR varies from 4 to 12 dB. This variations affect the values of $\alpha_2$, $\alpha_3$, and $\alpha_4$.

Figure 14:
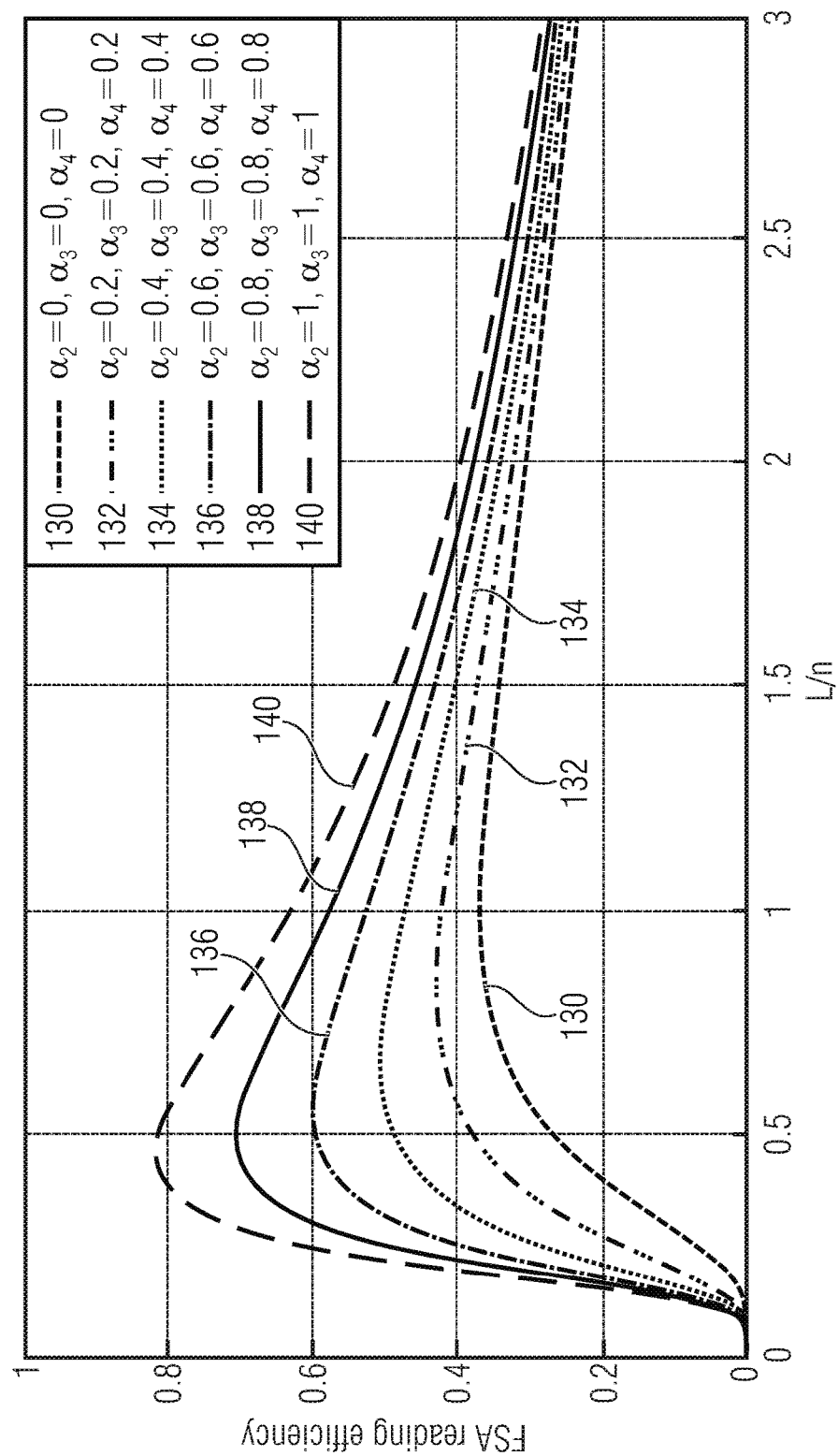
FIG. 14 shows in a diagram curves of the dynamic collision recovery reading efficiency for different collision recovery coefficients plotted over a normalized frame length (L/n)

FIG. 14 shows the proposed dynamic collision recovery reading efficiency $\eta_{DCR}$ for different values of collision recovery coefficients. In detail, a first curve 130 represents the conventional reading efficiency without collision recovery, i.e. $\alpha_2=0$, $\alpha_3=0$, $\alpha_4=0$. A second curve 132 represents the dynamic collision recovery reading efficiency $\eta_{DCR}$ for $\alpha_2=0.2$, $\alpha_3=0.2$, $\alpha_4=0.2$. A third curve 134 represents the dynamic collision recovery reading efficiency $\eta_{DCR}$ for $\alpha_2=0.4$, $\alpha_3=0.4$, $\alpha_4=0.4$. A fourth curve 136 represents the dynamic collision recovery reading efficiency $\eta_{DCR}$ for $\alpha_2=0.6$, $\alpha_3=0.6$, $\alpha_4=0.6$. A fifth curve 138 represents the dynamic collision recovery reading efficiency $\eta_{DCR}$ for $\alpha_2=0.8$, $\alpha_3=0.8$, $\alpha_4=0.8$. A sixth curve 140 represents 100% collision recovery, i.e. $\alpha_2=1$, $\alpha_3=1$, $\alpha_4=1$ which was assumed in [C. Angerer, R. Langwieser, and M. Rupp, "RFID reader receivers for physical layer collision recovery," Communications, IEEE Transactions on, vol. 58, pp. 3526-3537, December 2010]. However, in practice the values of $\alpha_2$, $\alpha_3$, and $\alpha_4$ change dynamically for each frame, and accordingly affect the reading efficiency and hence the value of the optimum frame length (of each frame).

Figure 15:
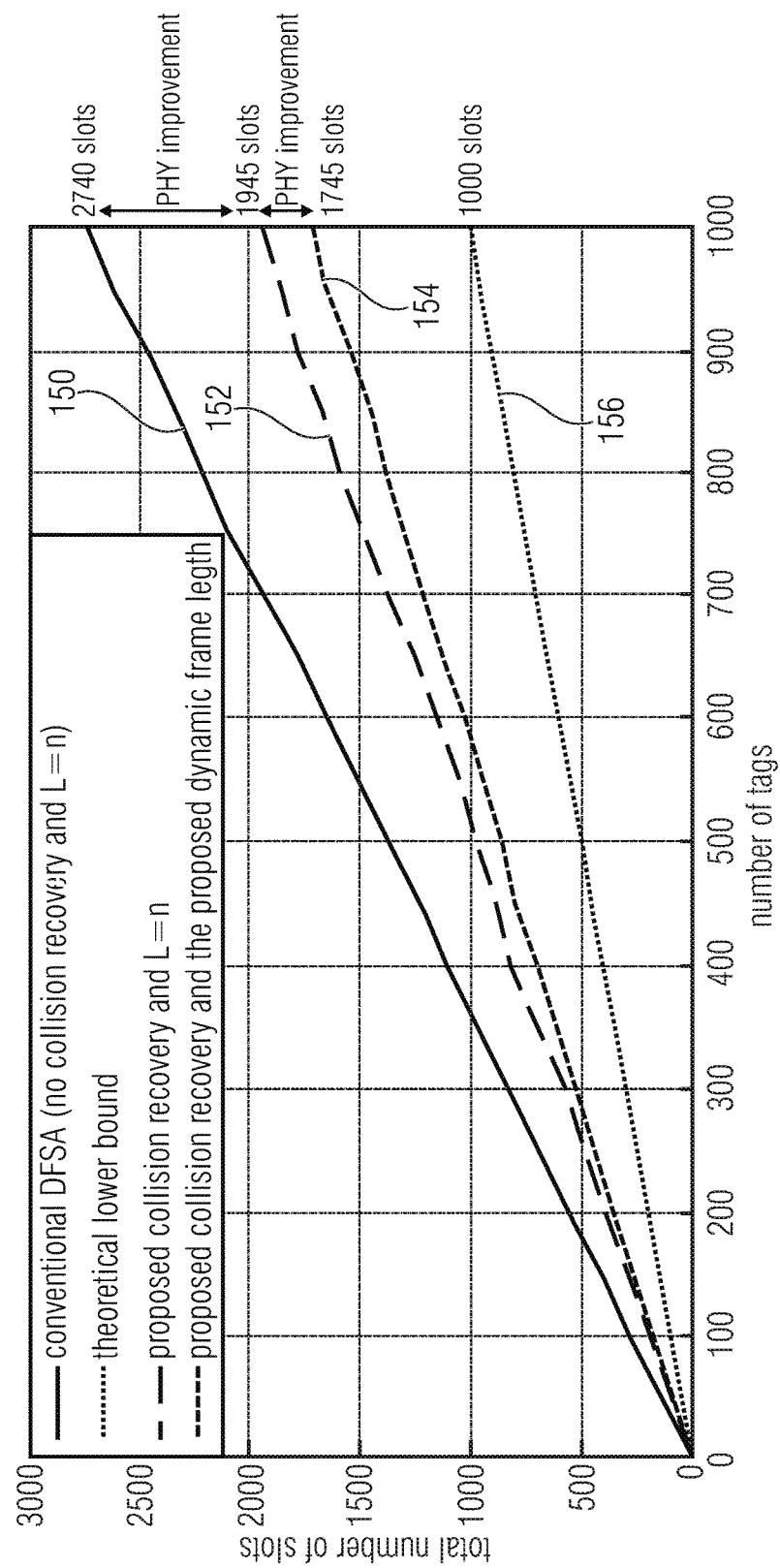
FIG. 15 shows in a diagram a comparison between total reading times of embodiments of the present invention and conventional solutions plotted over the number of tags.

In the following, the gain provided by embodiments of the present invention compared to the conventional solutions are clarified. In other words, the performance provided by embodiments of the present invention is evaluated. FIG. 15 shows in a diagram a comparison between total reading times (number of slots) plotted over the number of tags (in the reading area) of embodiments of the present invention and conventional solutions. In detail, in FIG. 15 a first curve 150 represents the total reading time when using a conventional DFSA (no collision recovery and L=n), a second curve 152 represents the total reading time when using the proposed collision recovery and L=n, a third curve 154 represents the total reading time when using the proposed collision recovery and the proposed dynamic frame length, and a fourth curve 156 represents a theoretical lower bound of the total reading time.

As becomes clear from FIG. 15, embodiments provide two independent improvements:

PHY layer improvement: In this part, only the proposed collision recovery algorithm with the conventional frame length L=n is used. This improvement is presented at curve 152 in FIG. 15. This gives almost 30% reduction at the mean reading time compared to the conventional systems which do not use the collision recovery.

MAC layer improvement: In this part, the frame length is dynamically adapt to the collision recovery coefficient $\alpha_i$ values, which change based on the SNR of the current frame. This improvement is presented at the curve 154 in FIG. 15. This results around 10% reduction at the reading time compared to the PHY layer improvement without the frame length adaptation.

Embodiments provide the following advantages:

using the proposed RFID reader 100 and the method for operating the same, the mean reading (identification) time will decrease up to 40% compared to conventional systems; and the proposed RFID receiver does not need any channel state information (CSI) to recover the strongest tag from the collided slot.

Embodiments are useful for RFID applications:

which follow EPCglobal Class-1 Gen-2 standards;

which comprise a dense number of tags; and in which time is a very critical issue in the identification process.

Figure 16:
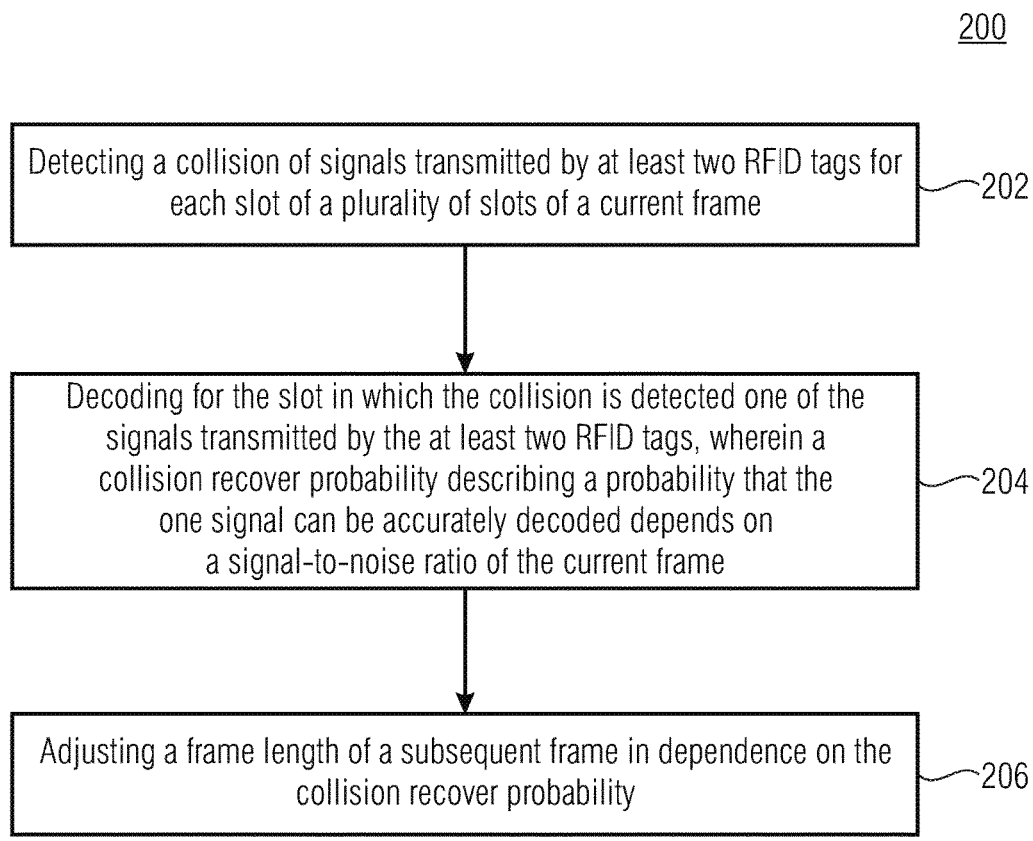
FIG. 16 shows a flowchart of a method for adjusting a frame length of an RFID system comprising an RFID reader and at least two RFID tags.

FIG. 16 shows a flowchart of a method 200 for adjusting a frame length of an RFID system comprising an RFID reader and at least two RFID tags. The method 200 comprises a step 202 of detecting a collision of signals transmitted by at least two RFID tags for each slot of a plurality of slots of a current frame. Further, the method 200 comprises a step 204 of decoding for the slot in which the collision is detected one of the signals transmitted by the at least two RFID tags, wherein a collision recover probability ($\alpha_i$) describing a probability that the one signal can be accurately decoded depends on a signal-to-noise ratio of the current frame. Moreover, the method 200 comprises a step 206 of adjusting a frame length (L) of a subsequent frame in dependence on the collision recover probability ($\alpha_i$).

One of the main challenges in RFID systems 200 is the collision recovery, i.e. the conversion of collided slots to successful slots. Collision recovery method presented in the literature need perfect channel knowledge, which is difficult with the RFID systems. In contrast to that, embodiments use a collision recovery based on the signal strength without channel estimation. The proposed concept (apparatus and method) recovers a single tag from up to four (or more) collided tags per slot. Further, the collision recovery probabilities from the physical layer are used to adjust the dynamic frame slotted ALOHA frame length L. This can be achieved by optimizing a reading efficiency metric. The mean reading time can be decreased up to 40% compared to conventional solutions.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An RFID reader, comprising:
a collision detector configured to detect for each slot of a plurality of slots of a current frame, in which a collision of signals transmitted by at least two RFID tags occurred, a signal property of a signal of the signals transmitted by the at least two RFID tags;
a decoder configured to decode for the slot in which the collision is detected the signal of the signals transmitted by the at least two RFID tags using the detected signal property, wherein a collision recover probability describing a probability that the decoder can accurately decode the one signal depends on a signal-to-noise ratio of the current frame; and
a frame length adjuster configured to adjust a frame length of a subsequent frame in dependence on the collision recover probability.

2. The RFID reader according to claim 1, wherein the collision detector is configured to detect the signal property of the signal of the signals transmitted by the at least two RFID tags having the greatest signal strength;
wherein the decoder is configured to decode for the slot in which the collision occurred the signal of the signals transmitted by the at least two RFID tags having the greatest signal strength;
wherein the frame length adjuster is configured to determine the collision recover probability describing a probability that the decoder can accurately decode the signal having the strongest signal strength in dependence on the signal-to-noise ratio of the current frame.

3. The RFID reader according to claim 2, wherein the determined collision recover probability is greater than zero.

4. The RFID reader according to claim 2, wherein the frame length adjuster is configured to determine the collision recover probability per frame.

5. The RFID reader according to claim 2, wherein the frame length adjuster is configured to adjust the frame length of the subsequent frame further in dependence on a collision probability describing the probability of the collision of the signals transmitted by the at least two RFID tags.

6. The RFID reader according to claim 5 wherein the frame length adjuster is configured to determine the collision probability using the formula:

$$P_{col}(i) = \binom{n}{i}\left(\frac{1}{L}\right)^i\left(1-\frac{1}{L}\right)^{n-i}$$

wherein n describes a number of tags in a reading area, wherein i describes a number of tags transmitting signals in the same slot, and wherein L describes the frame length.

7. The RFID reader according to claim 5, wherein the frame length adjuster is configured to determine a reading efficiency of the RFID reader in dependence on the collision probability and the determined collision recovery probability, and wherein the frame length adjuster is configured to adjust the frame length of the subsequent frame using the reading efficiency of the RFID reader.

8. The RFID reader according to claim 7, wherein the frame length adjuster is configured to adjust the frame length of the subsequent frame such that the reading efficiency of the RFID reader is increased.

9. The RFID reader according to claim 8, wherein the frame length adjuster is configured to adjust the frame length of the subsequent frame such that the reading efficiency of the RFID reader is maximized.

10. The RFID reader according to claim 7, wherein the frame length adjuster is configured to determine the reading efficiency based on the formula:

$$\eta_{DCR} = P(1) + \Sigma_{i=2}^{n} \alpha_i P_{col.}(i)$$

wherein describes the probability that only one RFID tag transmits a signal per slot, describes the probability that at least two RFID tags transmit signals per slot, describes the probability that the decoder can accurately decode the signal having the strongest signal strength when at least two RFID tags transmit signals per slot.

11. The RFID reader according to claim 1, wherein the frame length adjuster is configured to determine the collision recover probability in dependence on an average signal-to-noise ratio of the current frame.

12. The RFID reader according to claim 1, wherein the signal property is a backscatter link frequency.

13. Method for adjusting a frame length of an RFID system comprising an RFID reader and at least two RFID tags, the method comprising:
  detecting for each slot of a plurality of slots of a current frame, in which a collision of signals transmitted by at least two RFID tags occurred, a signal property of a signal of the signals transmitted by the at least two RFID tags;
  decoding for the slot in which the collision is detected the signal of the signals transmitted by the at least two RFID tags using the detected signal property, wherein a collision recover probability describing a probability that the one signal can be accurately decoded depends on a signal-to-noise ratio of the current frame; and
  adjusting a frame length of a subsequent frame in dependence on the collision recover probability.

14. A non-transitory digital storage medium having a computer program stored thereon to perform the method for adjusting a frame length of an RFID system comprising an RFID reader and at least two RFID tags, the method comprising:
  detecting for each slot of a plurality of slots of a current frame, in which a collision of signals transmitted by at least two RFID tags occurred, a signal property of a signal of the signals transmitted by the at least two RFID tags;
  decoding for the slot in which the collision is detected the signal of the signals transmitted by the at least two RFID tags using the detected signal property, wherein a collision recover probability describing a probability that the one signal can be accurately decoded depends on a signal-to-noise ratio of the current frame; and
  adjusting a frame length of a subsequent frame in dependence on the collision recover probability,
  when said computer program is run by a computer.

* * * * *